(12) United States Patent
Marceau et al.

(10) Patent No.: US 6,439,870 B1
(45) Date of Patent: Aug. 27, 2002

(54) APPARATUS FOR AUTOMATED OPHTHALMIC LENS FABRICATION

(75) Inventors: Gary Marceau; Dan Boulay; Ivan Nunez, all of Roanoke; Charles Foster, Thaxton; Eric Dogan, Roanoke; Joseph A. Bishop, Salem; Amitava Gupta, Roanoke; Steven Hamblin, Daleville; Edgar Menezes; Venkat Sekharipuram, both of Roanoke, all of VA (US); Ron Kok, Eindhoven (NL); Michael Hompus, Helmond (NL); Jack van Nunen, Wintelre (NL); Marc Evers, Geldrop (NL); Edwin van Doorn, Helmond (NL)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/579,354

(22) Filed: May 26, 2000

(51) Int. Cl.⁷ ............................ B29C 35/08; B29D 11/00
(52) U.S. Cl. ................. 425/111; 425/126.1; 425/174.4; 425/808; 264/2.4; 264/2.7
(58) Field of Search ............................ 425/111, 126.1, 425/174.4, 444, 808; 264/1.7, 2.2, 2.4, 2.7

(56) References Cited

U.S. PATENT DOCUMENTS

| | | | |
|---|---|---|---|
| 2,967,329 A | 1/1961 | Friedland et al. | |
| 5,269,978 A | * 12/1993 | Umetsu et al. | 264/1.4 |
| 5,288,221 A | 2/1994 | Stoerr et al. | |
| 5,372,755 A | 12/1994 | Stoerr et al. | |
| 5,989,462 A | * 11/1999 | Buazza et al. | 264/1.36 |
| 6,042,754 A | * 3/2000 | Yang et al. | 264/1.1 |
| 6,099,763 A | * 8/2000 | Su et al. | 264/2.2 |

FOREIGN PATENT DOCUMENTS

| | | |
|---|---|---|
| EP | 183324 | 6/1986 |
| EP | 318164 | 5/1989 |

* cited by examiner

Primary Examiner—James P. Mackey
Assistant Examiner—Donald Heckenberg
(74) Attorney, Agent, or Firm—Lois Gianneschi

(57) ABSTRACT

An apparatus for the automated production of ophthalmic lenses, particularly compound lenses having a plastic coating on a plastic lens is described. A mold, after rotational orientation, is placed in a gimbal assembly to provide for the proper tilt. This gimbal assembly forms part of a fixture attached to an indexing means which moves for complete assembly of a molding fixture and then moves the molding fixture through a chamber to cure the resin. A preform, after rotational orientation, is held, by a preform gripper placed above the mold, and with sufficient clearance between the mold and the preform to allow the correct resin thickness during the curing portion of the process. The fixture is also provided with members to firmly grip the preform gripper so as to maintain its orientation throughout the curing process.

13 Claims, 21 Drawing Sheets

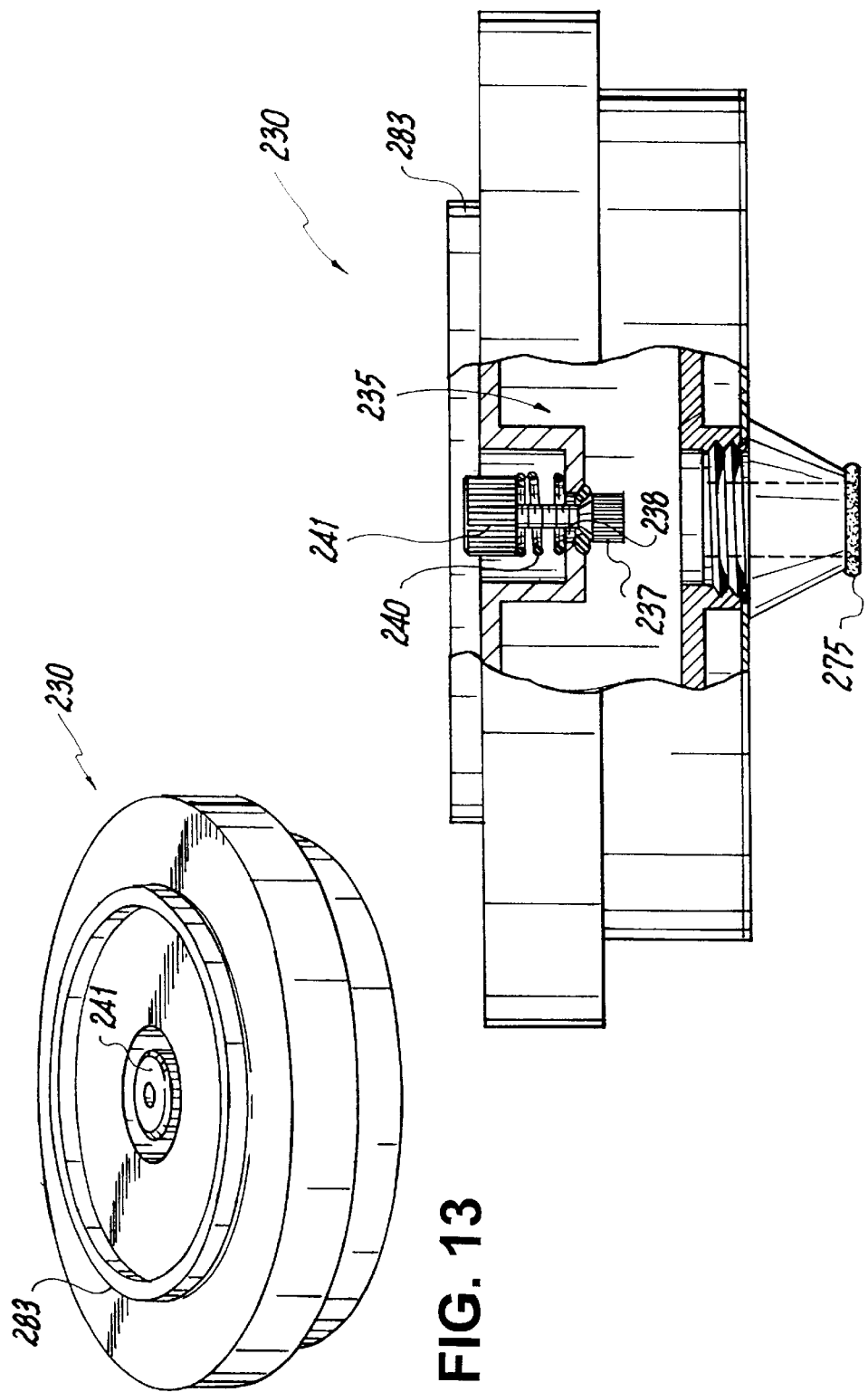

FIG. 24
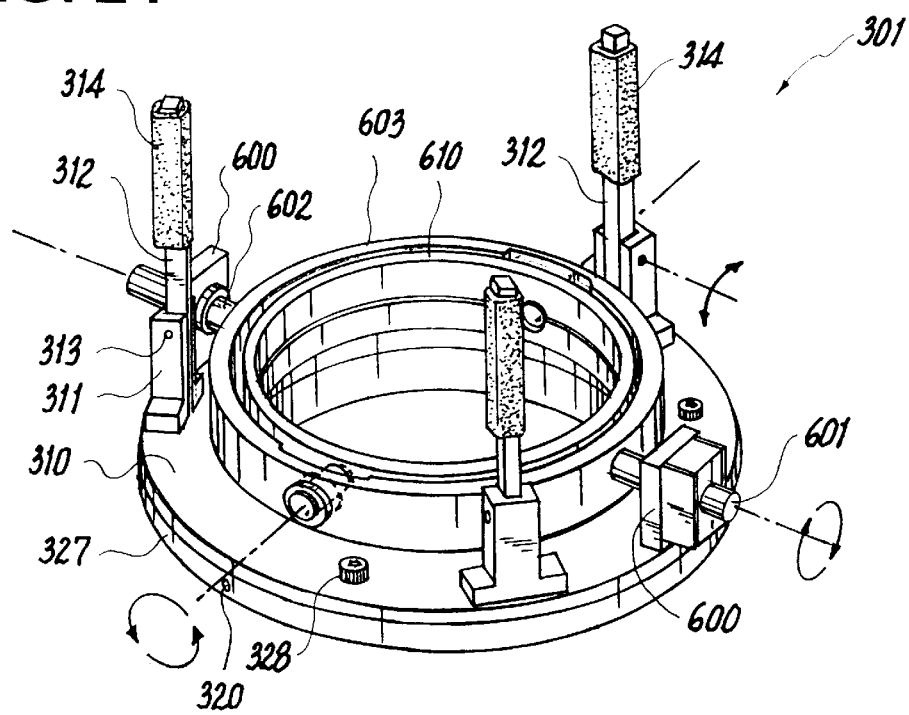
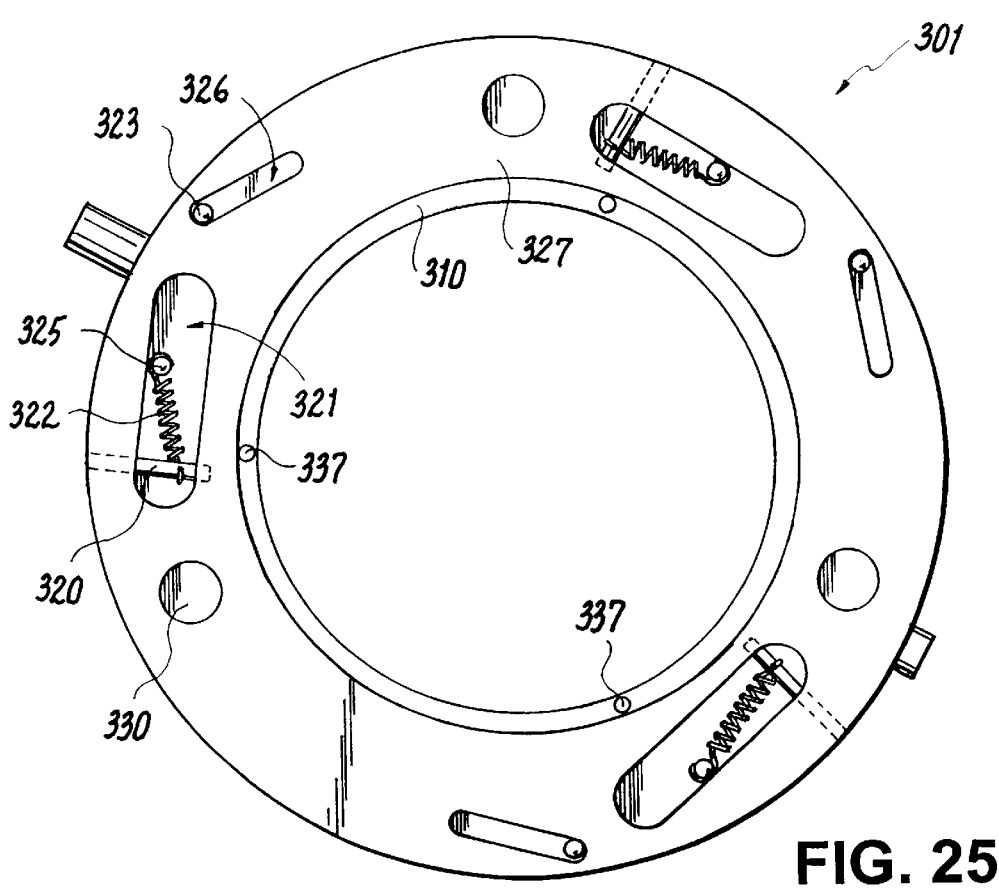
FIG. 25

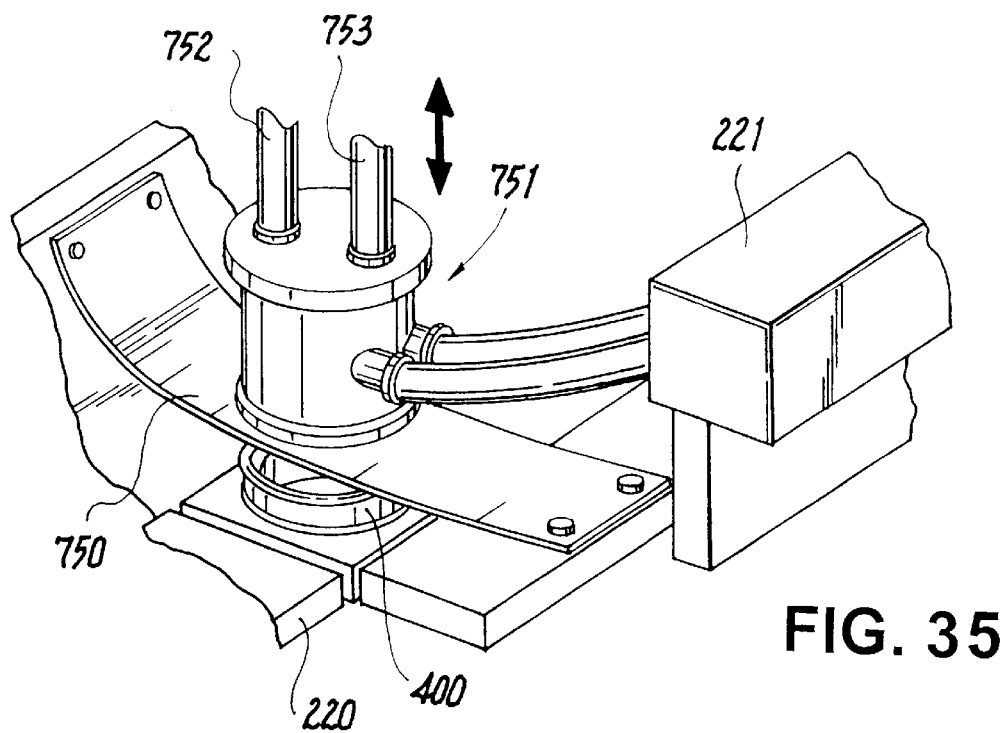
FIG. 35
FIG. 36
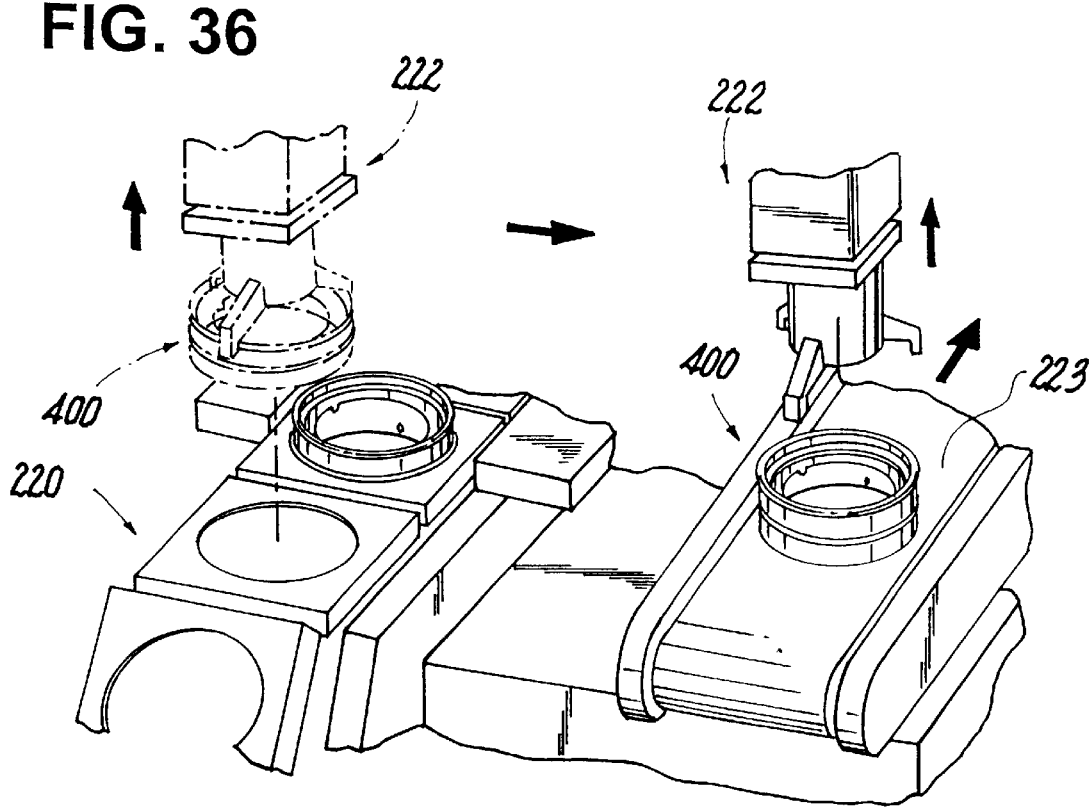

APPARATUS FOR AUTOMATED OPHTHALMIC LENS FABRICATION

FIELD OF THE INVENTION

The invention pertains to apparatuses useful in the automated production of ophthalmic lenses. In accordance with the present invention, an apparatus has been developed which allows for production of lenses in an automated, continuous fashion, while maintaining the close tolerances required.

BACKGROUND OF THE INVENTION

With the continuing growth in the sales of ophthalmic lenses, continuous, automated production of such lenses becomes increasingly important from the standpoint of economy. However, if the specific prescription called for is not duplicated, then the improved economy is of little consequence. One method of manufacturing ophthalmic lenses produces lenses with two or more layers, each layer having a set of optical characteristics.

Several prior art patents have described methods for forming such lenses. For example, in U.S. Pat. No. 5,288,221, Stoerr et al., is described an apparatus for making ophthalmic lenses in which a resin placed between an optical preform (which forms a portion of the ultimate lens) and an optical mold is cured by ultraviolet radiation. However, there is no description of an apparatus employing the structure of the Stoerr et al. patent in an automated, continuous process, Similarly, processes and apparatuses for manufacture of this type of lens are shown in U.S. Pat. Nos. 5,702,819, Gupta et al., and 5,316,702, Blum et al. However, these, again, do not provide apparatuses for continuous, automated production.

In accordance with the present invention, an apparatus has been provided for the continuous, automated production of composite ophthalmic lenses that allows for the production of a multitude of prescription combinations, while employing a minimum number of parts and operations.

Figure 15:
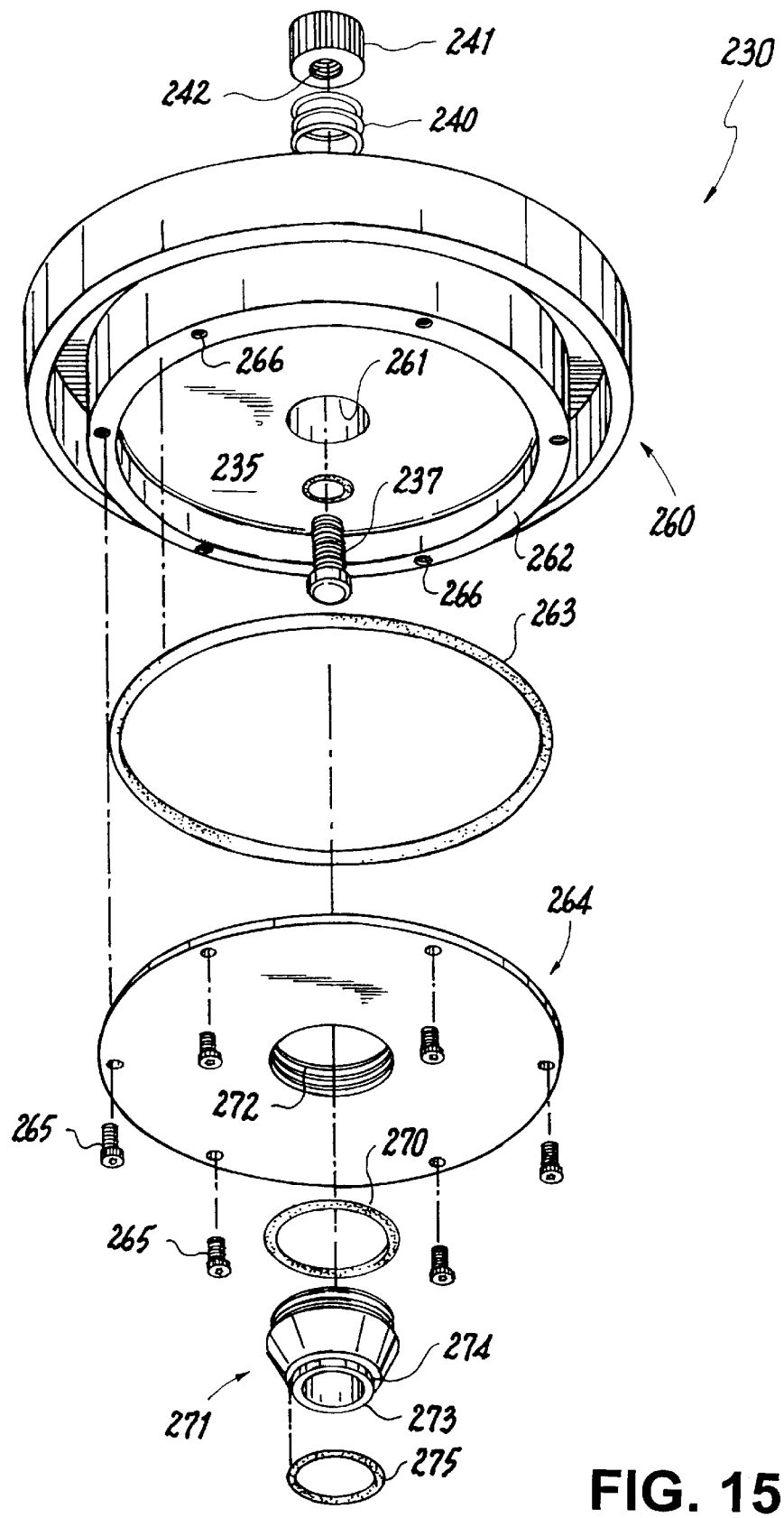
Figure 16:
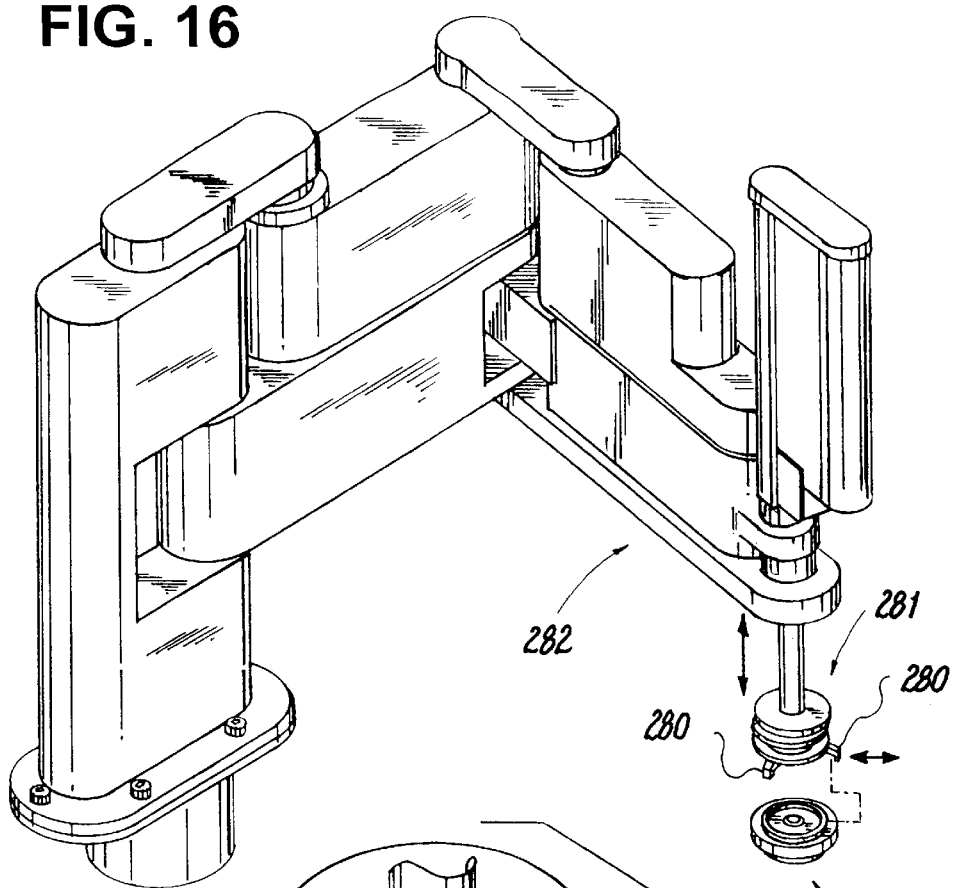
Figure 17:
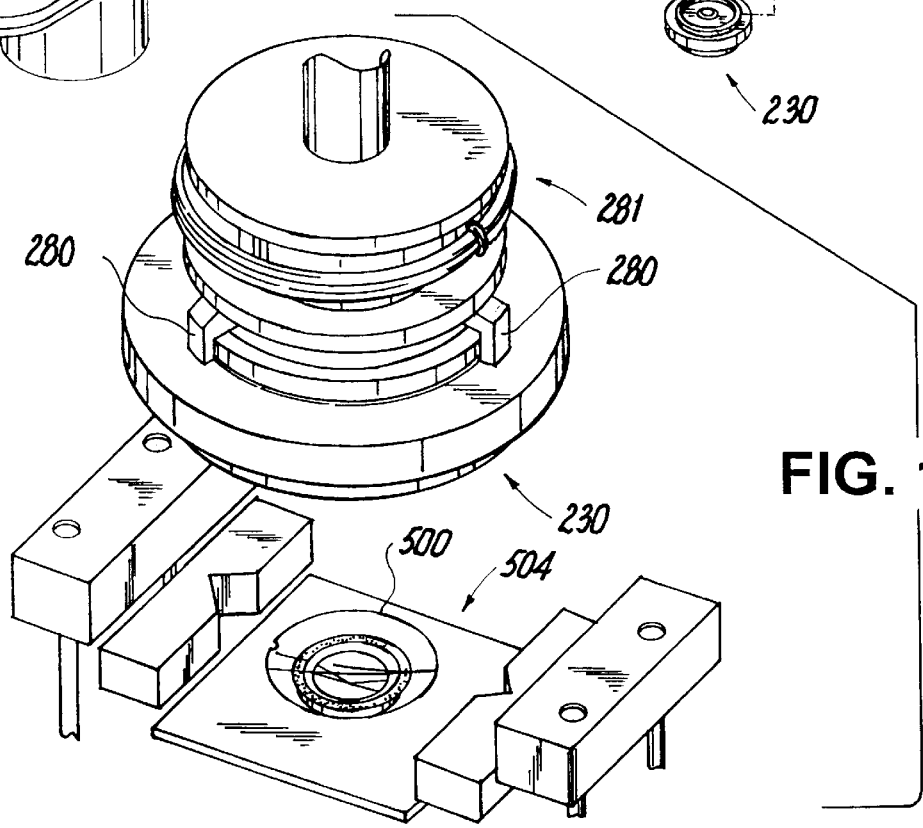
Figure 18:
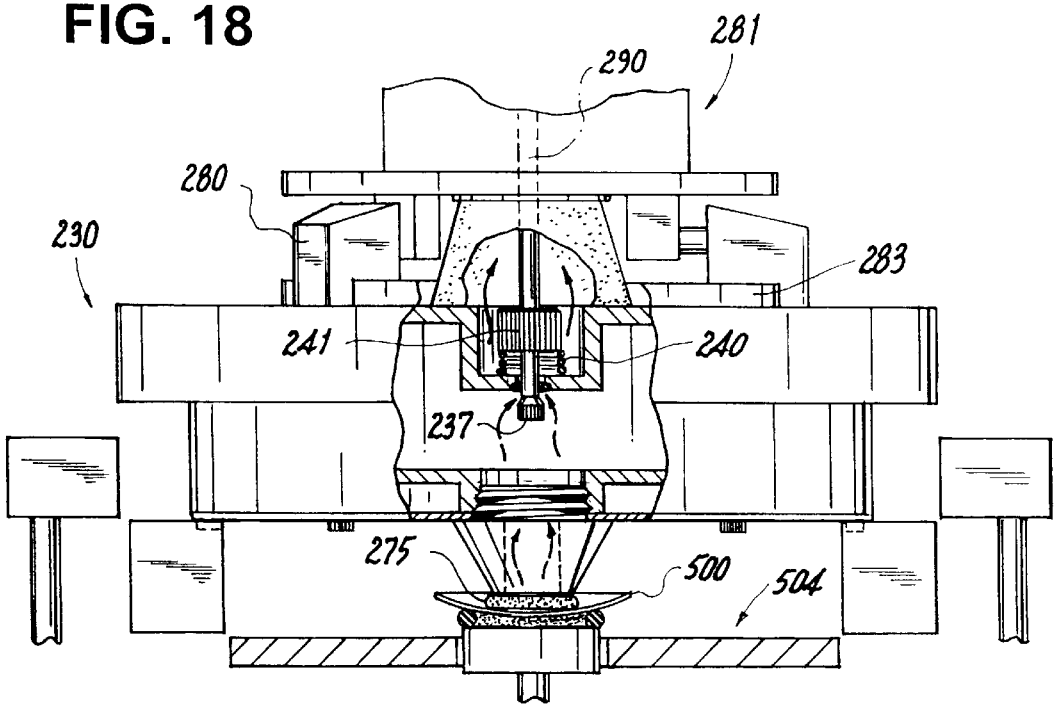
Figure 19:
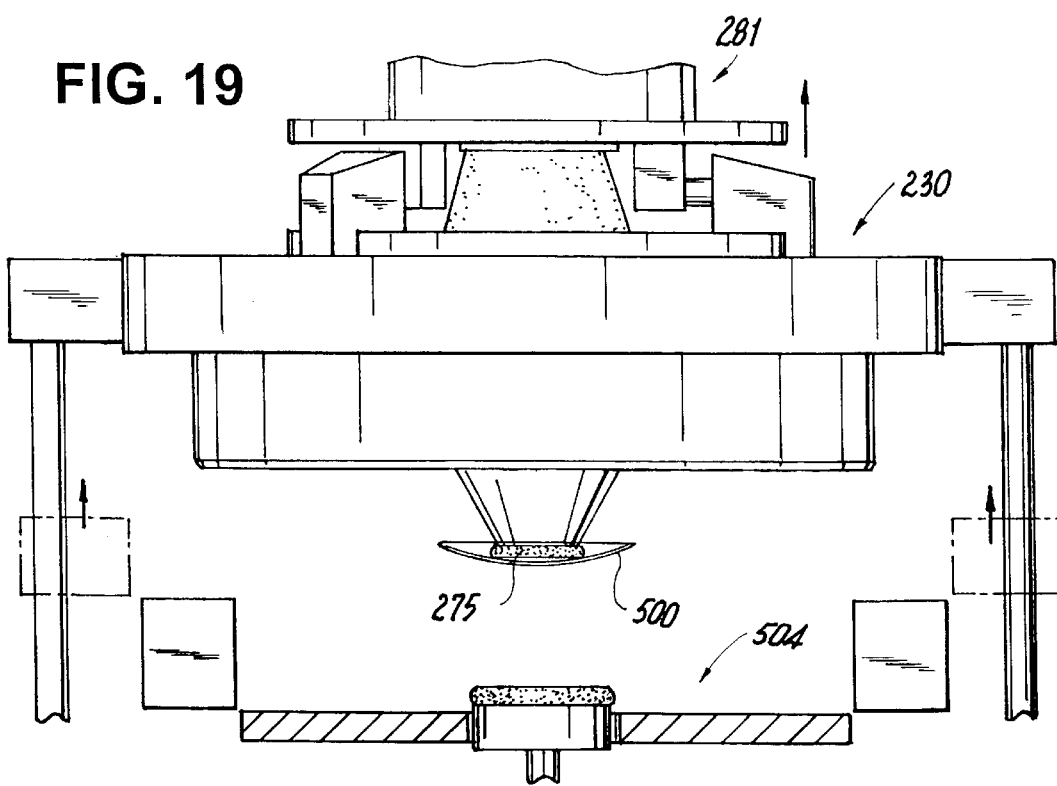
Figure 20:
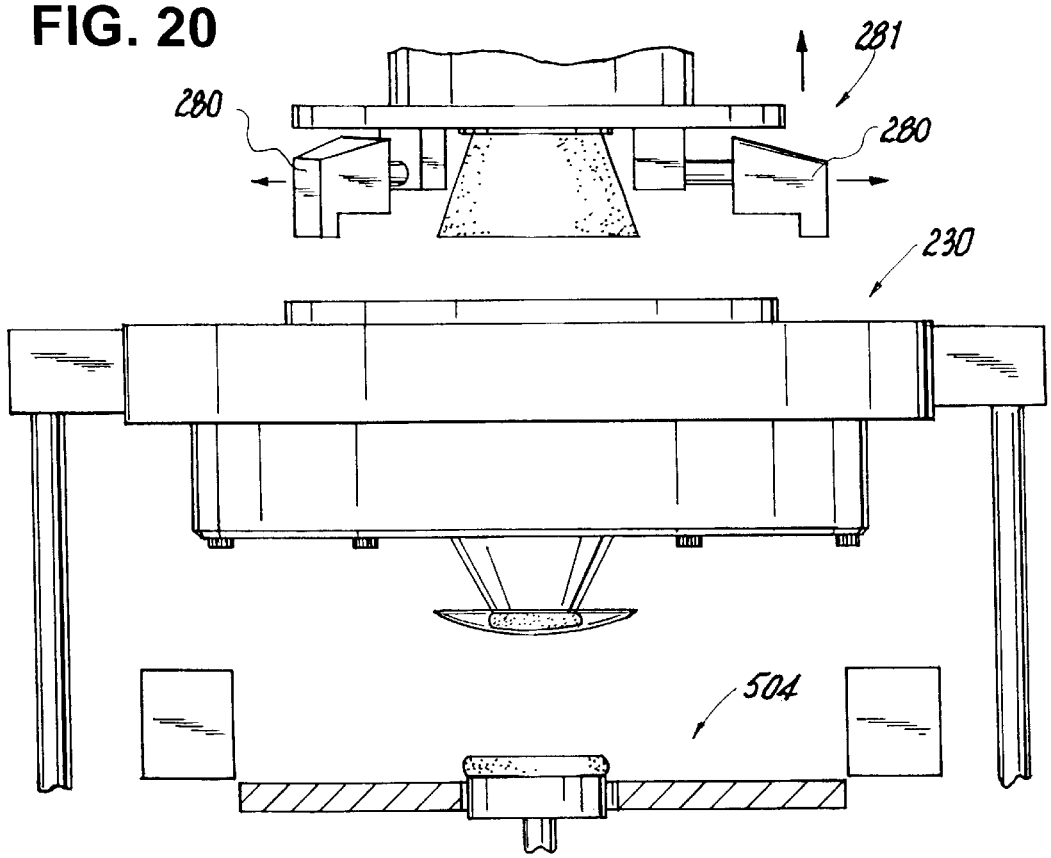
Figure 21:
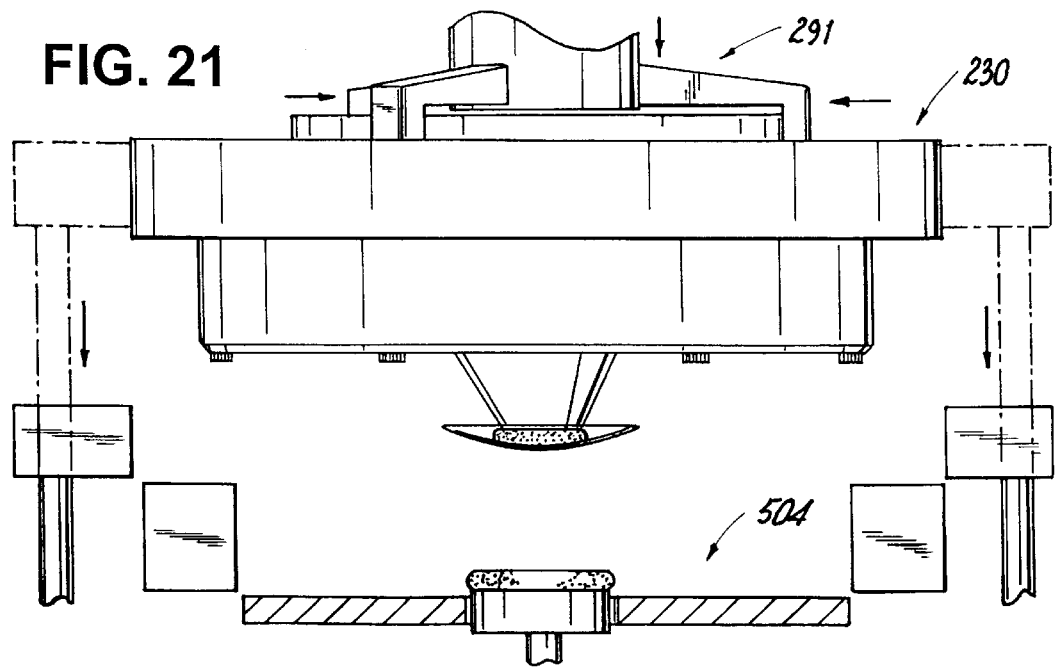
Figure 22:
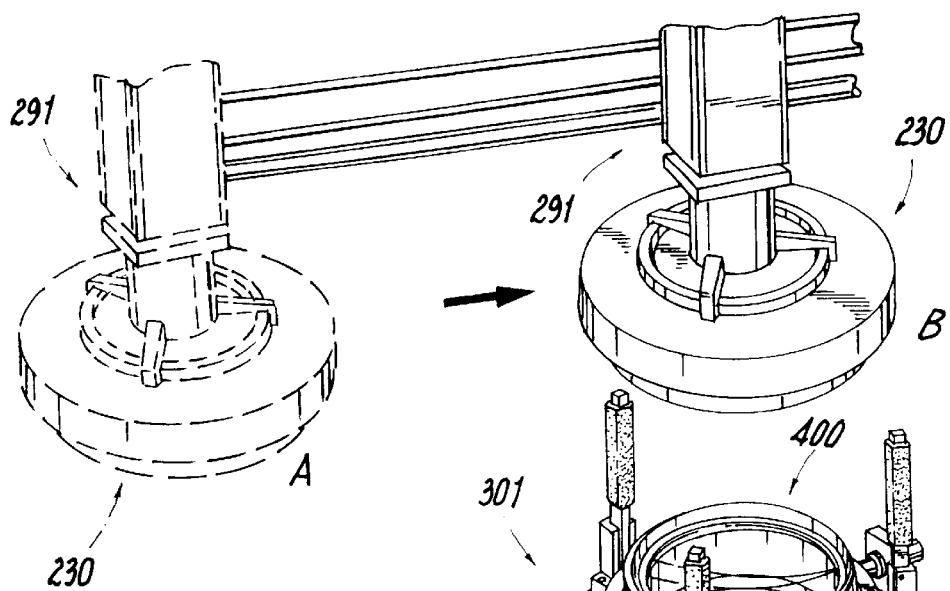
Figure 23:
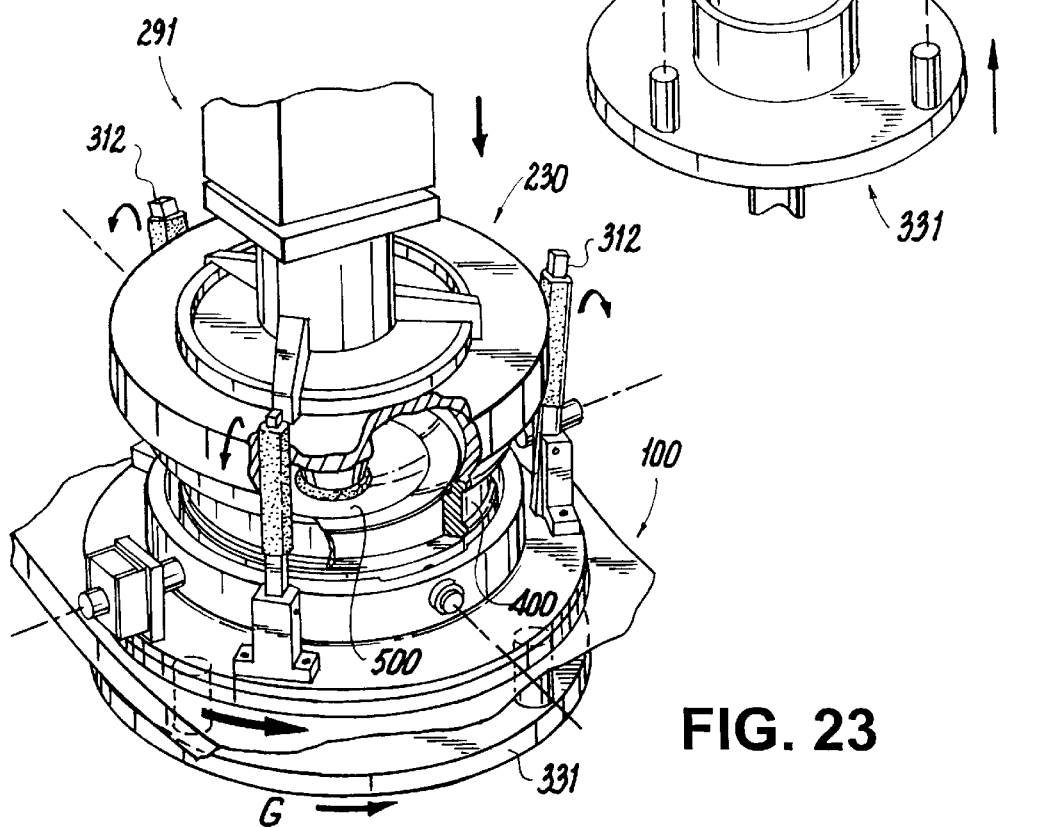
Figure 26:
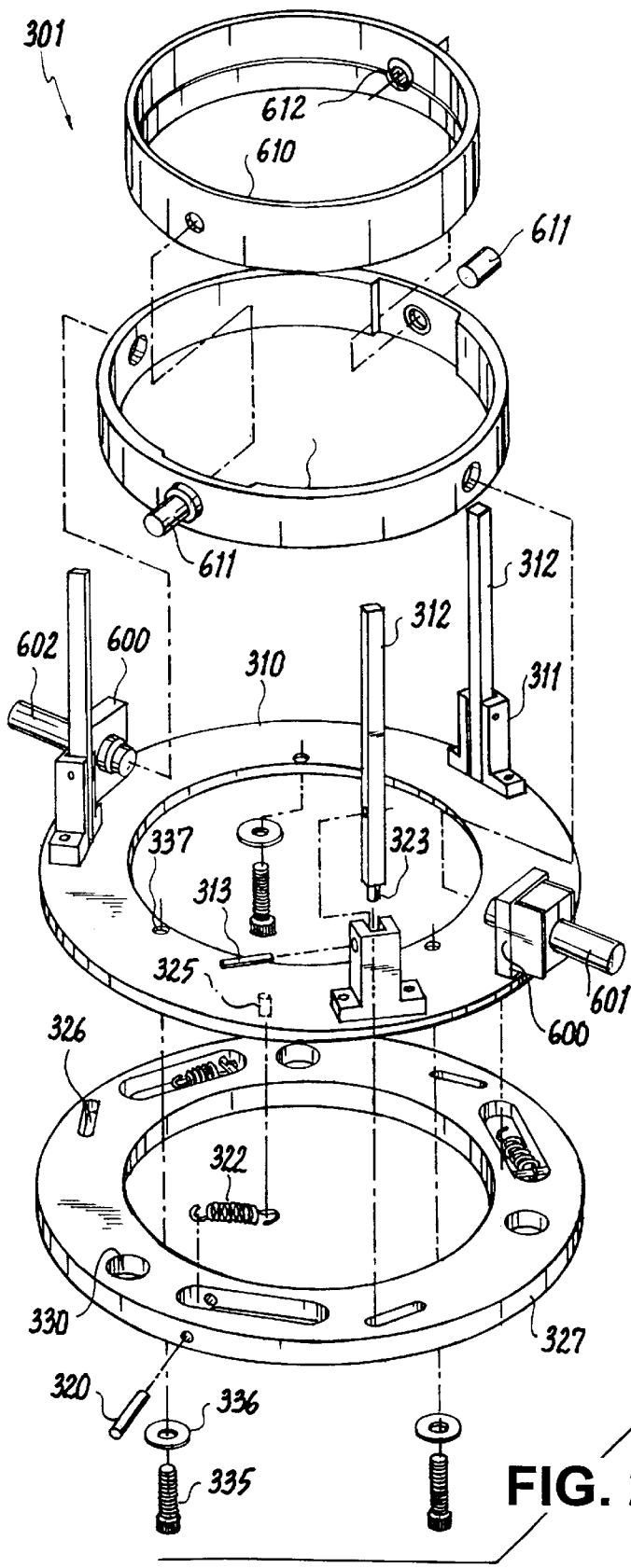
Figure 27:
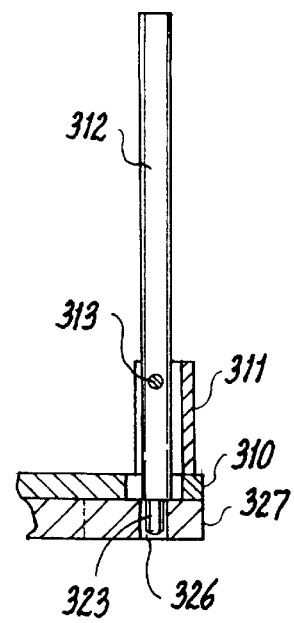
Figure 28:
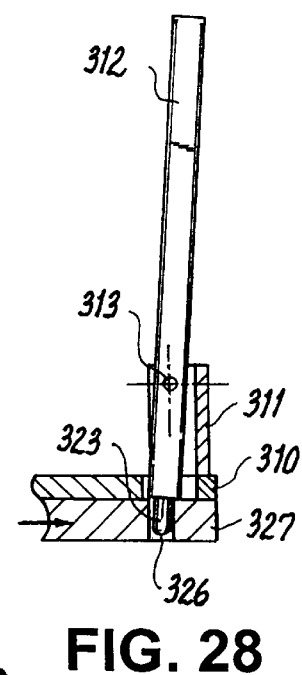
Figure 29:
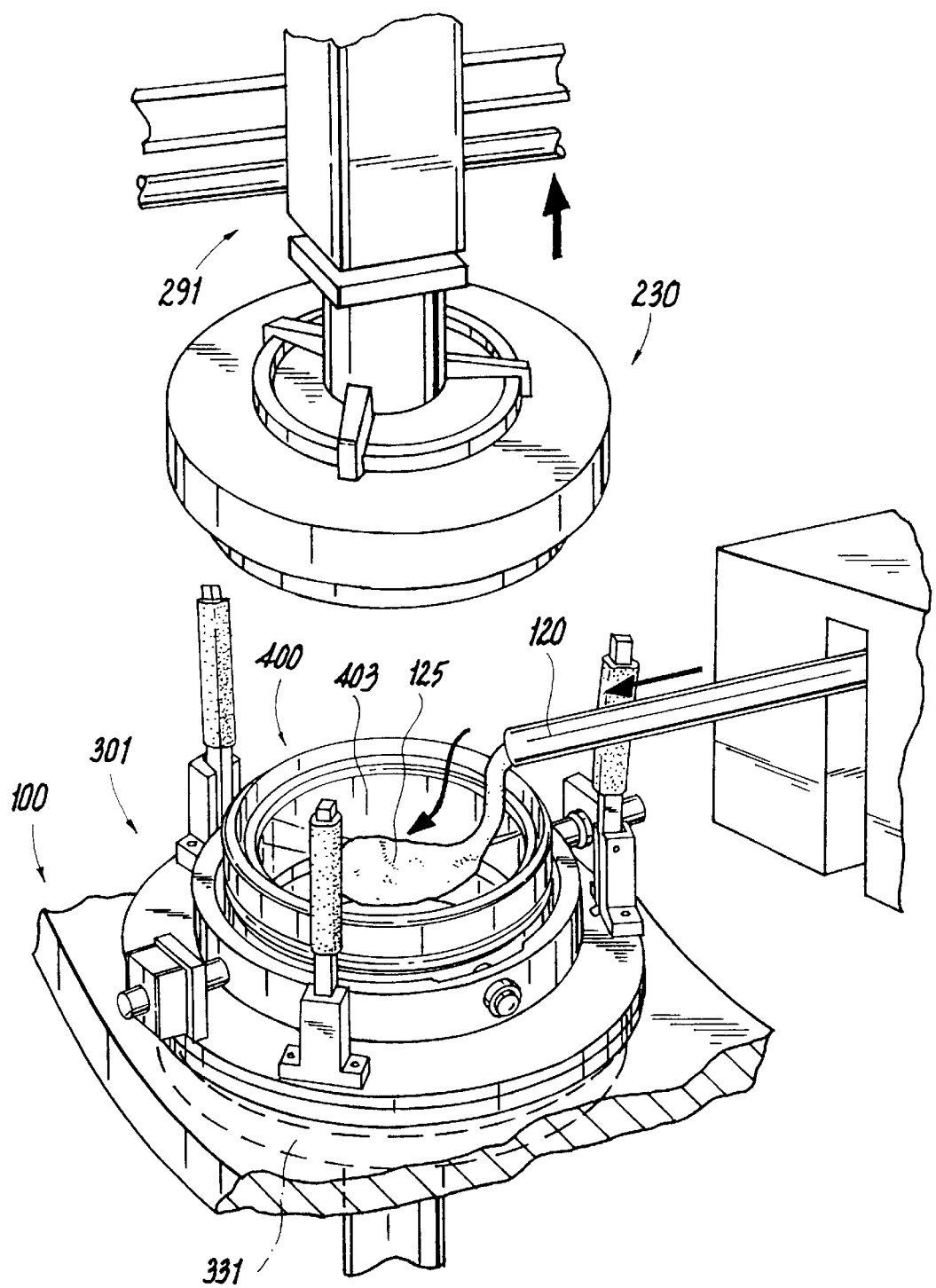
Figure 30:
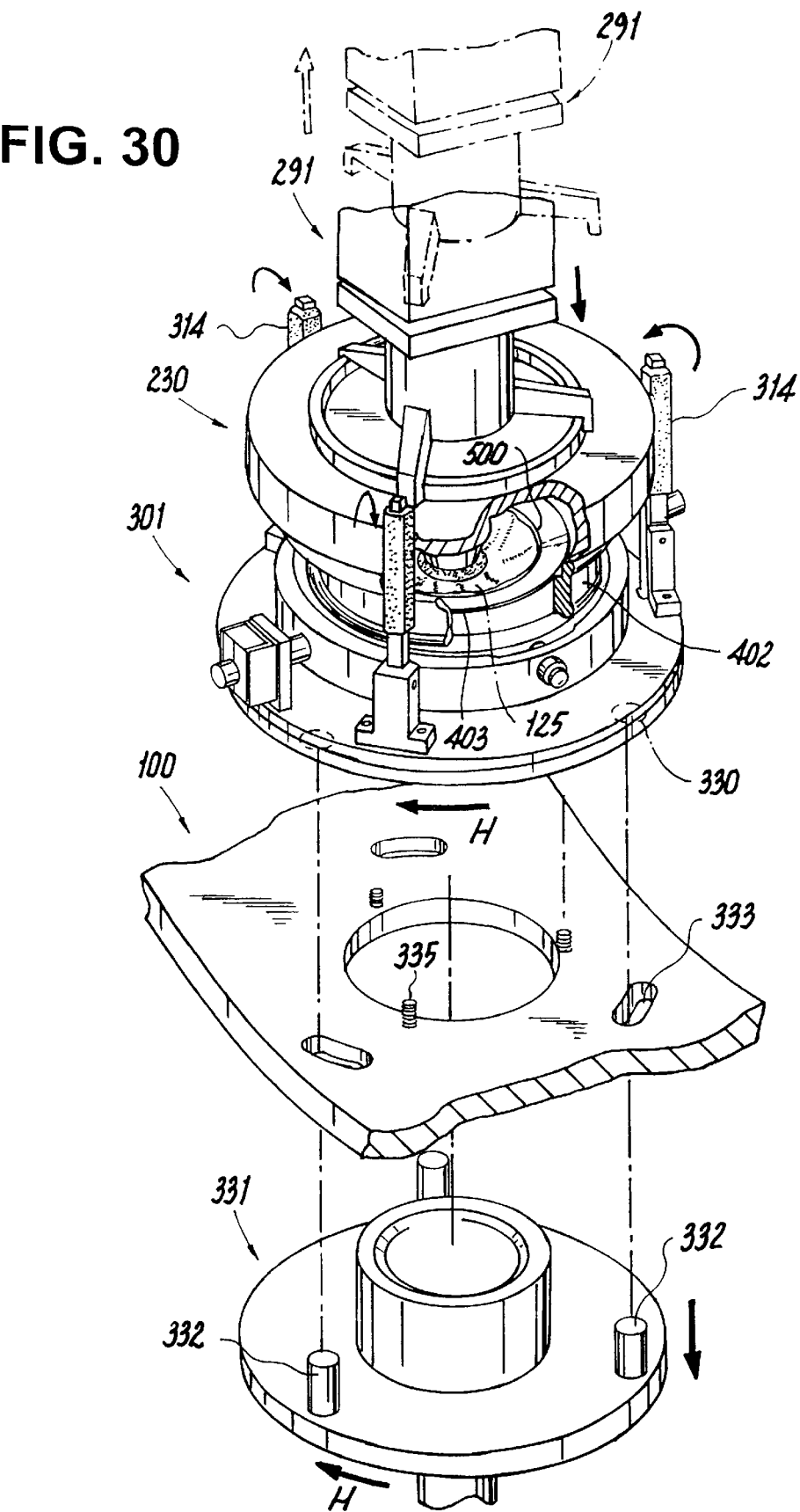
Figure 31:
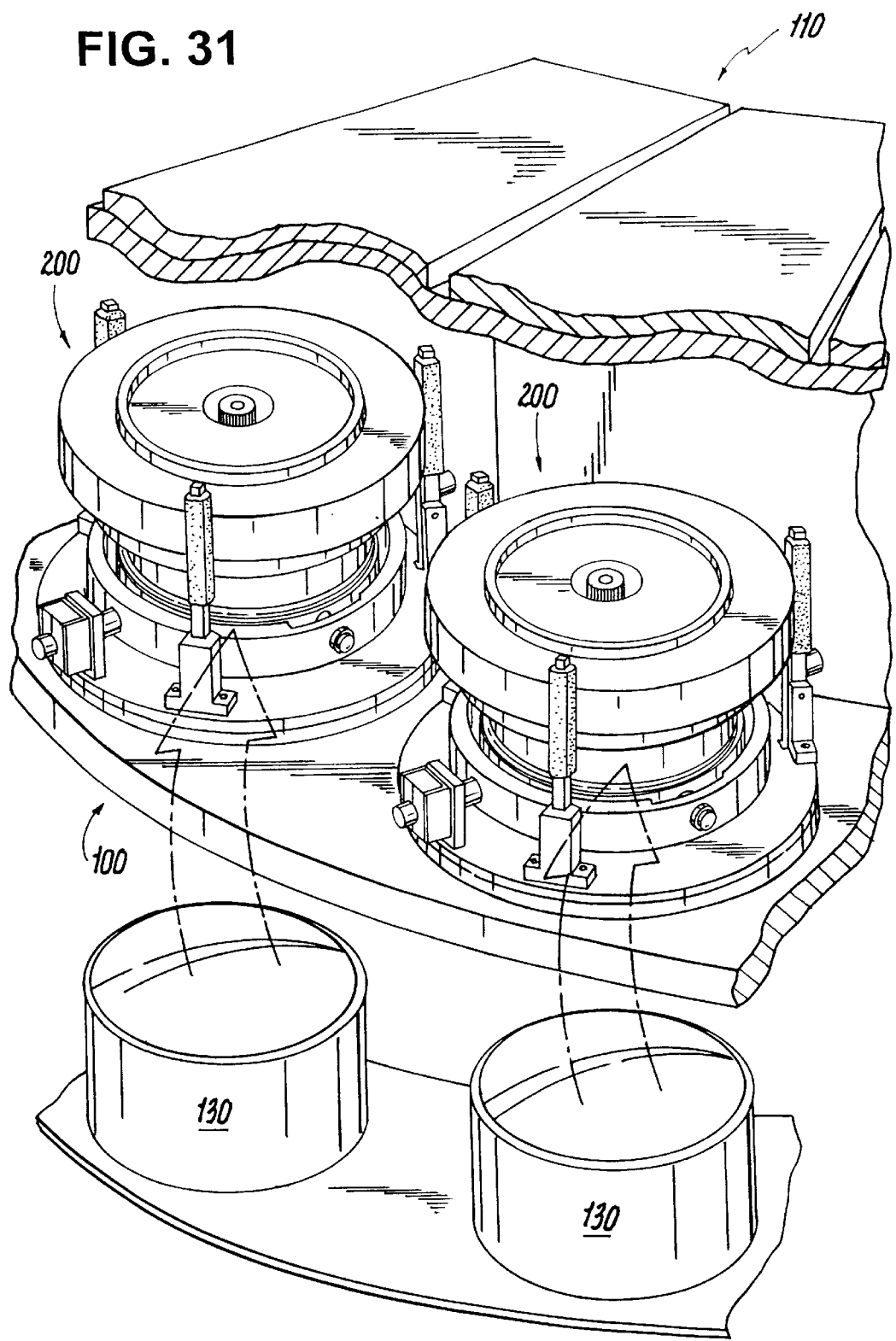
Figure 32:
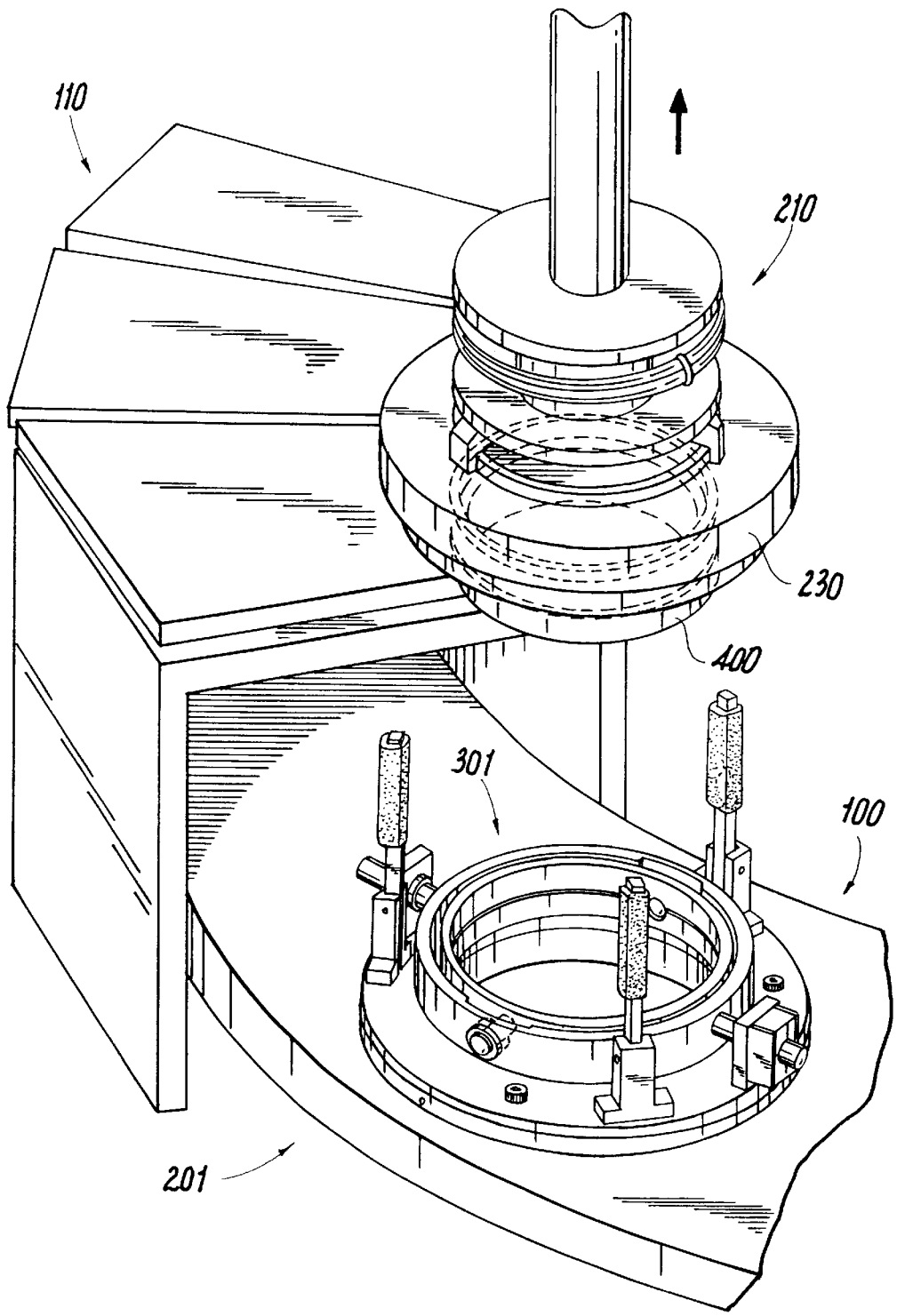
Figures 33, 34:
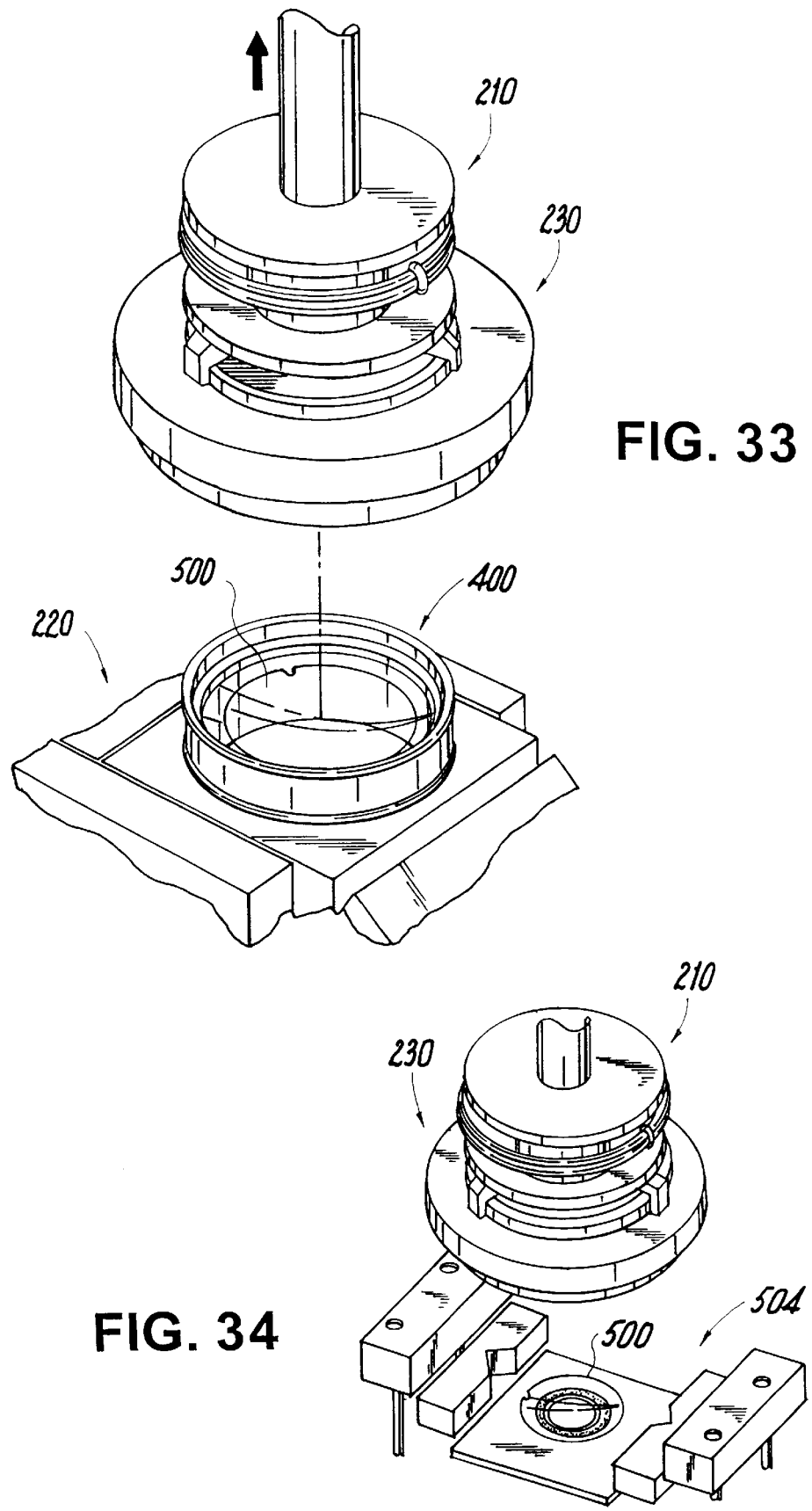
Figure 37:
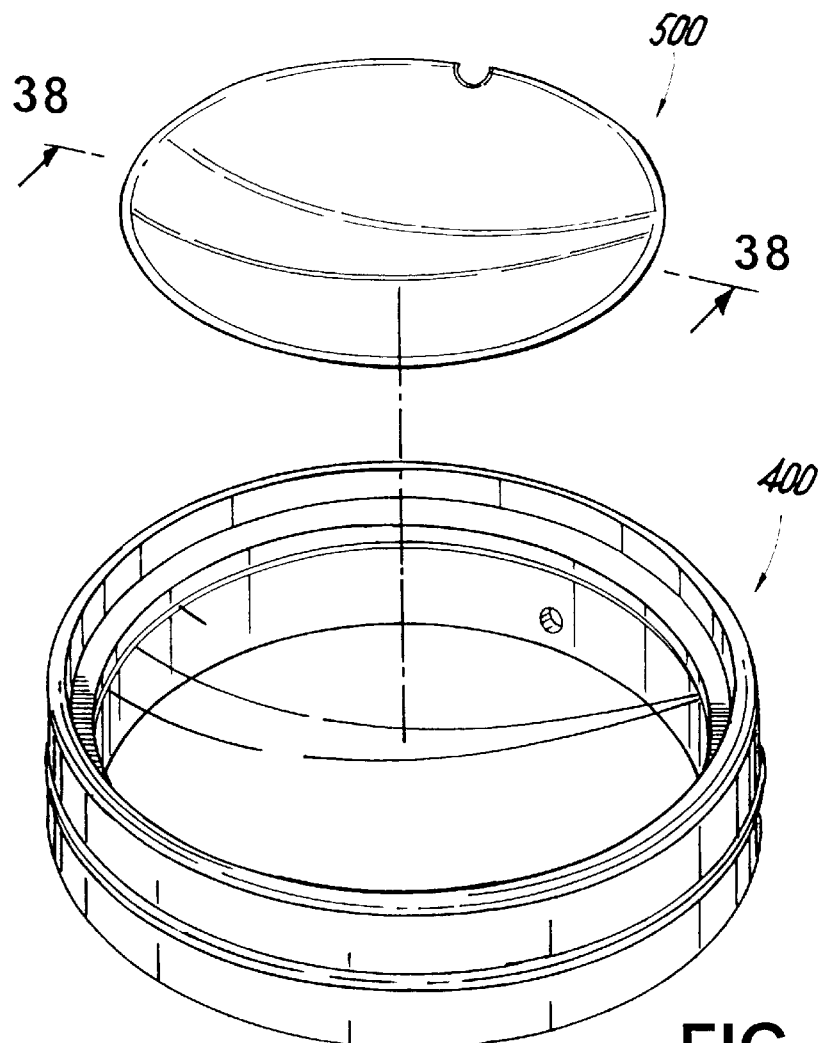
Figure 38:
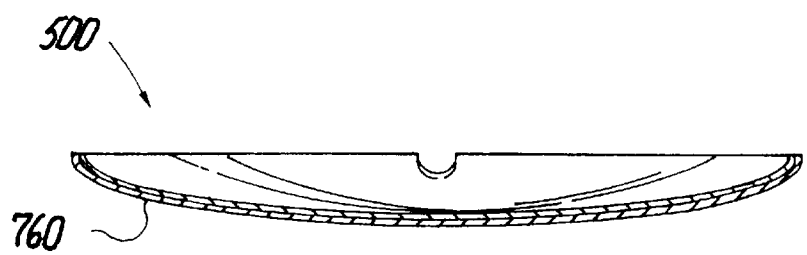
Figure 39:
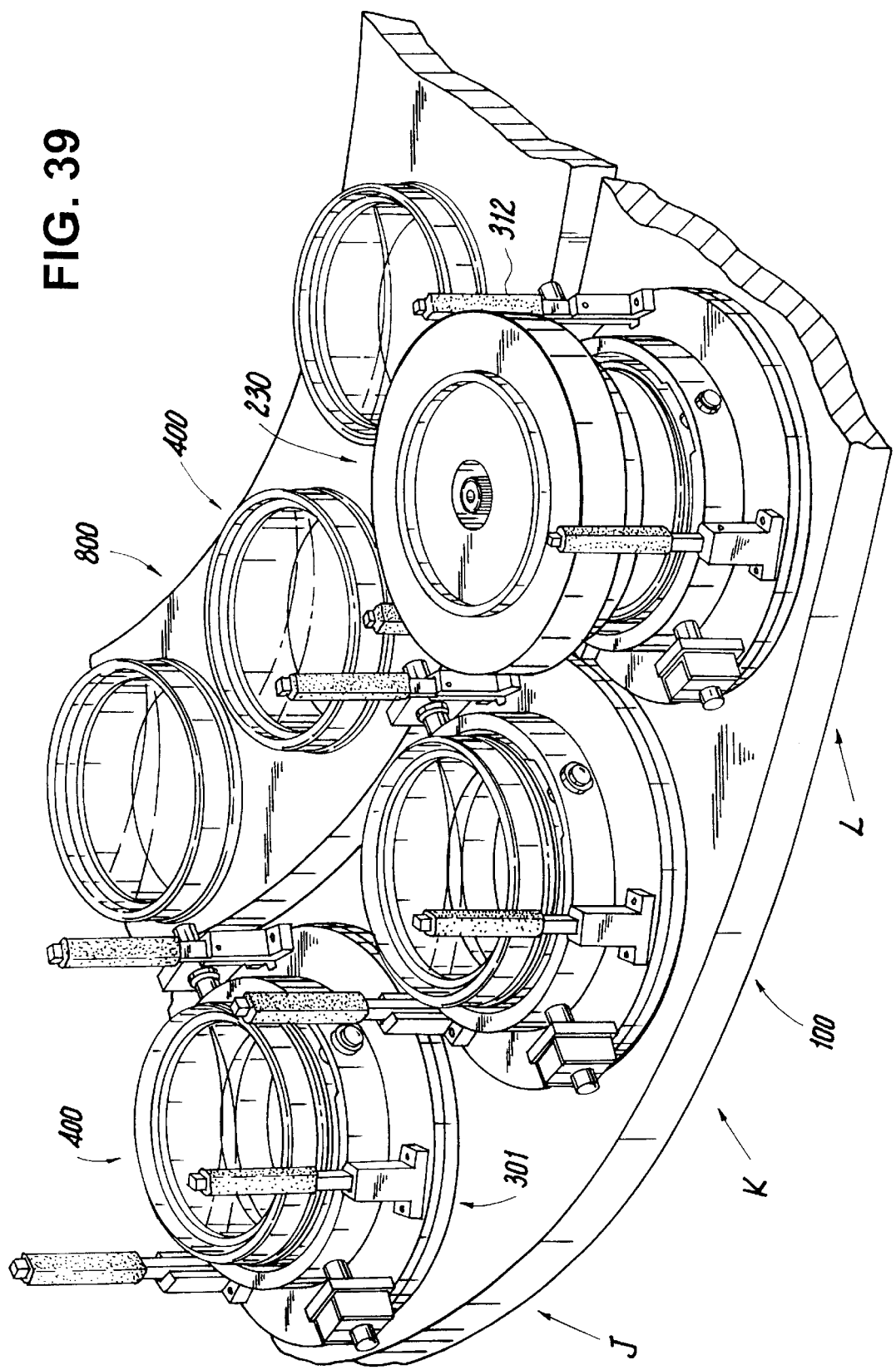

FIG: 12 is a perspective view of the preform rotating on the turntable for proper orientation, adjacent a retractable optical system and strobe light;

FIG. 13 is a perspective view of a typical preform gripper;

FIG. 14 is an elevation in partial cutaway of the preform gripper, illustrating the internal components;

FIG. 15 is an underside perspective view with parts exploded of a typical preform gripper;

FIG. 16 is a perspective view of a robotic pivot arm, primarily employed to transfer preform gripper devices to various sites during the casting process;

FIG. 17 is a perspective view of the preform gripper, staged for delivery to the properly oriented preform, by the robotic arm;

FIG. 18 is an elevational view, in partial cutaway, of the preform gripper contacting and suctioning the preform via the robotic arm;

FIG. 19 is an elevational view of the robotic arm retracting up the preform gripper/preform assembly, with clamping bars activated to secure the assembly;

FIG. 20 is an elevational view of the robotic arm releasing and retracting from the preform gripper;

FIG. 21 is an elevational view of the preform gripper/preform assembly grasped by a sliding three jaw apparatus, with clamping bars released;

FIG. 22 is a perspective view of the jaw apparatus transferring the preform gripper/preform assembly to a staged mold/gimbal fixture;

FIG. 23 is a perspective view, in partial cutaway, of the mold/gimbal fixture, with fingers pivoted, lowering the preform gripper/preform assembly to properly gimbal the mold in relation to the preform and to initiate the action of a servo mechanism to set the distance between the mold and the preform after the resin has been placed in the mold;

FIG. 24 is a perspective of the gimbal fixture, illustrating the axes of rotation of the gimballing rings;

FIG. 25 is an underside plan view of the gimbal fixture of FIG. 24, illustrating the spring-loaded, rotatable lower plate, which is used to pivot the upstanding fingers;

FIG. 26 is an exploded perspective of the components of the gimbal fixture of FIG. 24;

FIG. 27 is a sectional elevation of a typical finger in a clamping position;

FIG. 28 is a sectional elevation of the finger in FIG. 27, but in an unclamped position due to rotation of the lower plate;

FIG. 29 is a perspective view of the preform gripper/preform assembly, retracted up after contacting the servo mechanism, allowing resin to be flowed into mold via a retractable delivery tube;

FIG. 30 is an exploded perspective view of the preform gripper/preform assembly installed adjacent the mold, with the relationship of the gimbal fixture, the rotating dial and the retractable finger clamp actuator illustrated;

FIG. 31 is a perspective view, in partial cutaway, of typical complete mold assemblies indexed over U.V. lights to facilitate curing;

FIG. 32 is a perspective view of a robotic arm removing the preform gripper/preform assembly and mold from the transport fixture upon final curing;

FIG. 33 is a perspective of the robotic arm transferring the mold/preform to a conveyor, while retaining the preform gripper;

FIG. 34 is a perspective view of the robotic arm recycling the preform gripper to the preform platform, as in FIG. 17;

FIG. 35 is a perspective view of a typical bladder assembly acting on the mold/preform within the cooling chamber;

FIG. 36 is a perspective view of the cooled mold/preform assembly exiting the chamber, and transferred to a discharge conveyor by a sliding three jaw apparatus;

FIG. 37 is a perspective view of the chilled preform removed from the mold;

FIG. 38 is a sectional elevation of the preform illustrating the cured resinous coating; and, FIG. 39 is a perspective view of an alternate embodiment in which the mold carrying fixture is cycled on an indexing dial.

DETAILED DESCRIPTION OF THE INVENTION

The apparatus of the invention provides an assembly of a mold half or mold, a curable optical quality resin composition, and an optical preform, in a fashion such that the resin composition is disposed between, and in contact with, the preform and the mold; a further portion of the apparatus provides for curing the resin to form a composite lens comprising a cured plastic portion bonded to the preform.

For purposes of this invention, the term "optical preform" or "preform" means a shaped, optically transparent article capable of refracting light and suitable for use in producing a spectacle lens. The preform may be constructed of any material capable of functioning as a component of a spectacle lens. Illustrative materials include, without limitation, polycarbonates, such as bisphenol A polycarbonate, allyl diglycol carbonates, allylic esters, acrylic esters, acrylates, methacrylates, styrenics, polyesters, and the like and combinations thereof Molds useful in the invention may be formed from any material used in for forming molds for spectacle lens production. Generally, the molds may be formed of glass, plastic, or the like and preferably glass molds are used.

The resin used may be any resin containing one or more mono- or polyfunctional monomers suitable for use for casting a surface onto an optical preform. Suitable mono- and polyfunctional polymers include, without limitation, those disclosed in U.S. Pat. No. 5,470,892 incorporated herein by reference in its entirety. Additional suitable monomers include, without limitation, allyl and bis(allyl) carbonates, acrylic acid, multifunctional acrylates and methacrylates, styrene and styrene derivatives, various esters of maleic and itaconic acids, methacrylic and acrylic anhydrides and the, like, and combinations thereof. The resin preferably contains an appropriate initiator including, without limitation, an ultra-violet initiator, a thermal initiator, or combinations thereof.

According to various embodiments, one or more prescriptive or non-prescriptive layers may be cast onto the preform. Preferably, one or more prescriptive layers are cast. By prescriptive layer is meant a layer that adds at least one refractive power. The refractive power added may be a portion or all of the distance, near, intermediate, or cylinder power or combinations thereof, of the finished lens to be formed. Preferably a portion of the distance power is cast. More preferably, the cast layer forms a progressive surface.

In accordance with the present invention, all of the parts necessary for molding and curing an ophthalmic lens are joined together as a single assembly on the horizontal surface of an indexing apparatus, preferably at the periphery. A plurality of positions are provided on the periphery, so that as one or more of the assemblies are being completed, others are on another portion of the apparatus at which curing of the resin takes place. Such curing is generally accomplished by ultraviolet radiation.

In addition, areas are provided on the periphery of the indexing apparatus to remove the cured lenses from the indexing apparatus and transfer them to an apparatus at which the preform, with a coating of the newly applied resin, is separated from the mold for finishing. The mold is recycled to the start of the indexing apparatus to be incorporated in a new assembly, for repeating the process.

The mold is positioned relative to the preform based on a number of factors including the desired amount of separation between the preform and mold during resin curing; the lateral displacement of the mold primary reference point to match the primary reference point at the preform to minimize lens thickness; tilt of the mold relative to the preform to accommodate edge thickness and balancing and rotation of the preform relative to the mold to account for the cylinder axis for astigmatic prescriptions. The angular orientation of the mold to preform may be adjusted so that the cast layer provides for a specific lens wearer's pupillary convergence or cylinder prescription. Further, geometrical orientation of the mold to the preform may be adjusted to add prism or to produce a customized unfinished lens for use in a distinct frame size.

Means are provided to establish the proper orientation of the mold, in view of the described lens prescription; establish the proper orientation of the preform and its relationship to the mold, in view of the lens prescription; and establish the distance between the two closest points of the preform and the mold, i.e., the minimum thickness of the added resin layer.

While various means can be provided to set these various parameters, a mechanism must be provided to make certain that each part is held in place throughout the formative process of the lens material In accordance with the present invention, this is accomplished with a novel gimbal assembly fixture, to hold the position of the glass mold, and a locking mechanism which acts directly or indirectly on the remaining pieces of the mold assembly to lock them in place during the curing process.

Figure 1:
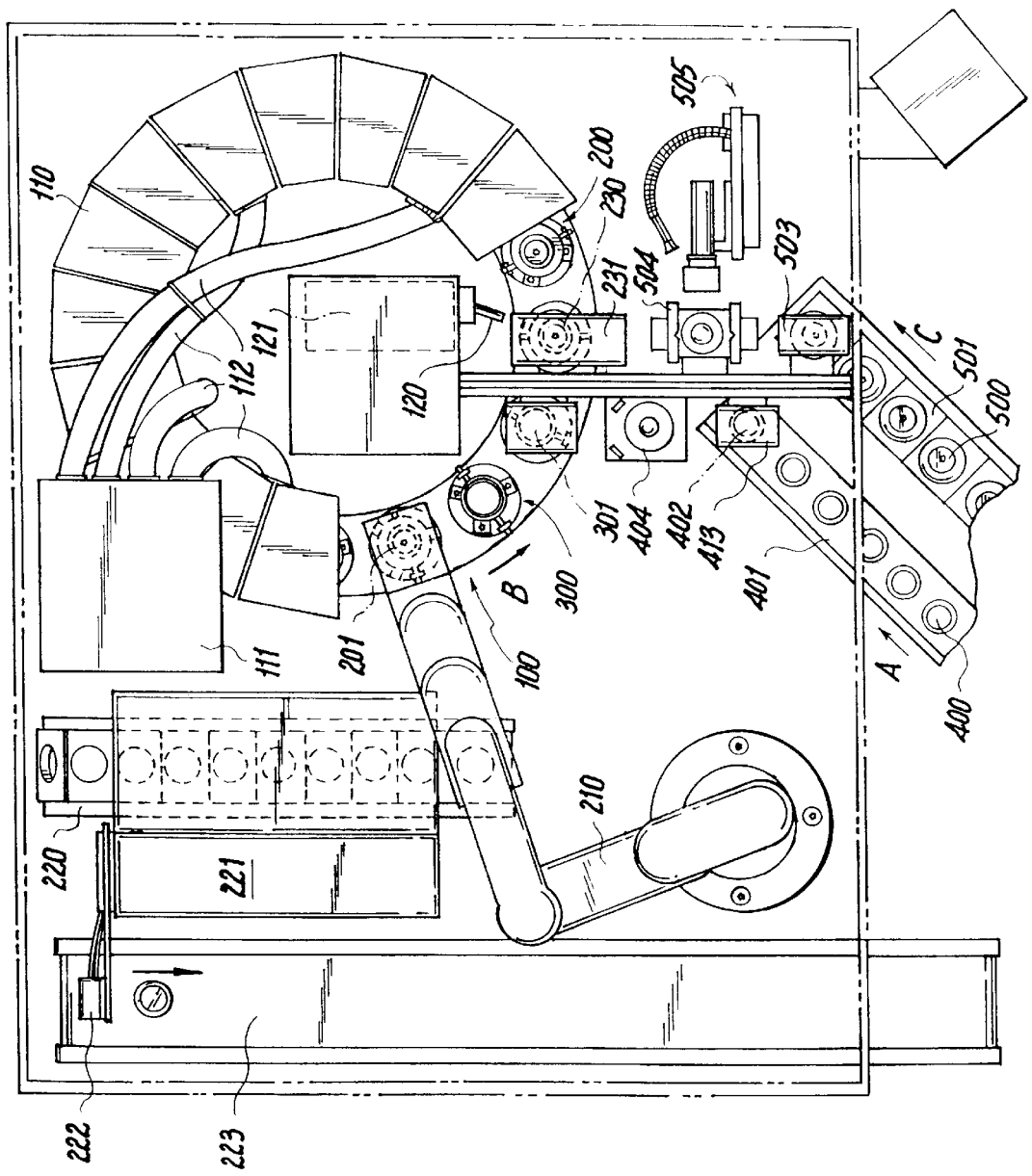
FIG. 1 is a schematic plan view of the various components of the optical casting machine.
Figure 2:
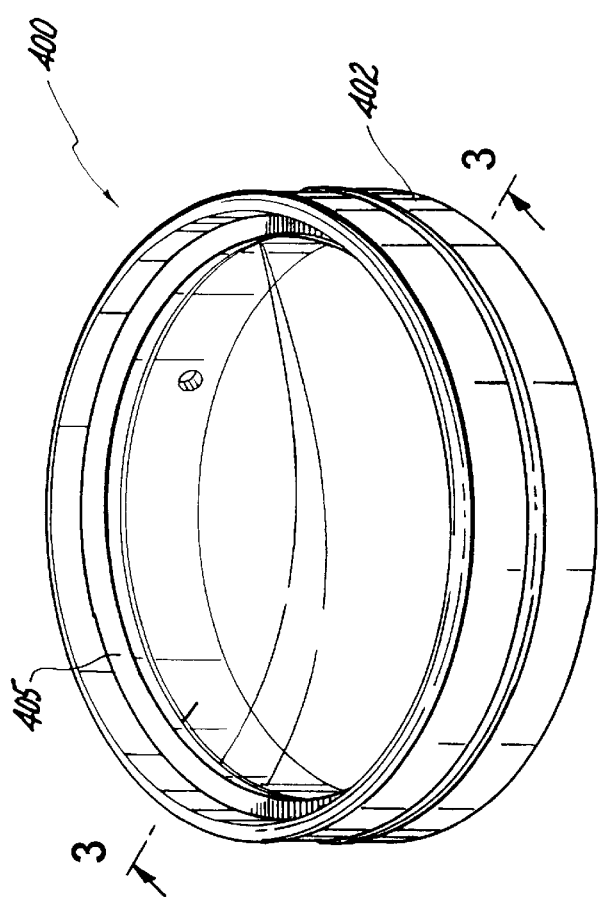
FIG. 2 is a perspective view of a typical mold for casting an optical lens.
Figure 3:
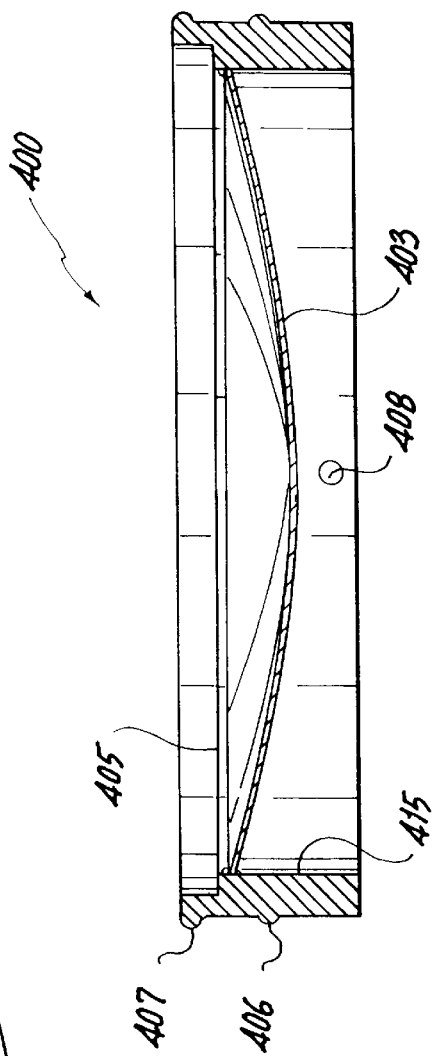
FIG. 3 is a sectional elevation, taken along lines 3—3 of FIG. 2.

Referring to the drawings, and particularly FIG. 1, an overall view of an embodiment of the apparatus of the present invention is shown. An indexing dial 100 is provided on which complete mold assemblies 200 are formed, resin placed into the complete mold assembly 200 to be cured, and the complete mold assembly carried through an oven for curing. While the indexing dial 100 illustrated is a preferred means of indexing the mold assemblies 200, in general, rotary. indexing dials and linear indexing tables can be used.

Ultraviolet radiation is supplied in a curing chamber 110 and heat may be injected into the system by an appropriate mechanism 111, not illustrated in detail. The ultraviolet radiation may be carried out in a single stage, or it may involve two stages, a low intensity radiation followed by a high intensity radiation, the two stage being preferred. Means for injecting heat from the mechanism 111 into the chamber 110 include the conduits 112, of which four are indicated. The chamber 110 is also provided with ultraviolet curing means. Alternatively, it may be desirable to remove heat from the chamber 110 via the conduits to cool the chamber to a desired degree below ambient temperature.

After completion of the curing portion of the operation, continued indexing of the indexing dial 100 in the direction illustrated by the arrow B causes a complete mold assembly 201, with a now cured resin, to be placed under a robotic arm 210 which disengages the gimbal fixture 300 from the remainder of the complete assembly. The mold and adhered composite lens (to be illustrated) are placed on a conveyor 220 which carries the parts through a chiller and progressive cooling tunnel 221. After passing through the cooling tunnel, a jaw apparatus 222 moves the now chilled mold and coated preform to a delivery conveyor 223. The now coated preform is removed from the mold for further processing while the mold is recycled through the apparatus. In an alternative embodiment, the mold and adhered lens may remain on the indexing dial, which dial incorporates the chiller and cooling tunnel.

The glass molds 400 are removed from the delivery conveyor or indexing dial (by means not,shown) and placed on a staging belt 401 to repeat the process employing the apparatus of the present invention. As the staging belt 401 moves in the direction shown by the arrow A, one glass mold 400 is placed under a suction apparatus 413 which raises the glass mold 400 and places it on a turntable 404 where it is optically scanned and rotated for proper orientation in accordance with the prescription of the composite lens to be manufactured. While a suction apparatus is illustrated here and elsewhere in the apparatus, other transfer means well known in the art, such as a robotic arm, may be used for movement and placement of the glass mold. The glass mold 400 is then carried to the indexing dial 100 and placed in an empty gimbal fixture 301 which, it will be appreciated, has moved from the position where it was separated from other portions of the complete mold assembly. It will further be appreciated that the staging belt 401 and the dial 100 are preferably indexed, rather than moved continuously, so that various portions of the apparatus are in alignment at the same time to allow the possibility of more than one operation at each index step.

In addition to the staging belt 401, there may be a second staging belt 501 where preforms 500 are conveyed in the direction C and indexed under a suction apparatus 503. The preform is carried by this suction apparatus to the preform turntable 504 which, employing the strobe and camera 505, comprising a notch detection system, properly orients the preform so that it will be in the desired position relative to the mold with which it will be associated in the complete mold assembly 200. Alternatively, the preform may be placed onto a suction apparatus on the indexing dial at which it undergoes notch detection as described. Additionally, rather than the strobe and camera, a tactile probe (not illustrated), or other well known locating or detecting means may be employed to accomplish the function. A preform gripper 230 is placed in association with the preform 500 and firmly grips it. The preferred gripper is the illustrated suction gripper. However, other types of grippers, such as 3-finger and diaphragm can also be used.

A robotic arm (only a portion of which is shown at 231) moves the gripper with the suction-attached preform to a position over the gimbal fixture 301. Employing means not illustrated in FIG. 1 the preform gripper 230, with the attached preform 500, is lowered by means of a servo motor into the gimbal assembly 301 until the furthest extended portion of the preform touches the mold where a signal is generated. A servo mechanism (not shown) is employed to translate this signal as will be explained later. In addition, the gimbal rings are appropriately positioned at this time. The gripper and preform are then raised out of the gimbal fixture and an amount of resin effective to provide the desired layer to be cast is delivered into the mold by any appropriate means. As illustrated, retractable outlet 120 is used to deliver the resin from resin reservoir 121 into the mold with the mold and preform separated a distance greater than that needed for the desired amount of resin. The preform gripper and preform are then lowered into the gimbal fixture 301, the preform 500 being spaced a selected number of microns, generally about 50 to about 100 microns, from the glass mold 400. By a mechanism to be later described, the gimbal fixture 301 is then locked to the preform gripper 230 to form the complete mold assembly 200 which is processed as described above.

In order to provide a better understanding of the apparatus of the present invention, especially the mold, reference is made to additional figures. The mold assembly can be a mold without a ring or holder, a mold glued into a ring horizontally, a mold glued into a ring with a predetermined tilt, or a mold mechanically mounted into the ring. In a preferred embodiment, the mold is mechanically mounted in the ring or holder horizontally.

Figure 4:
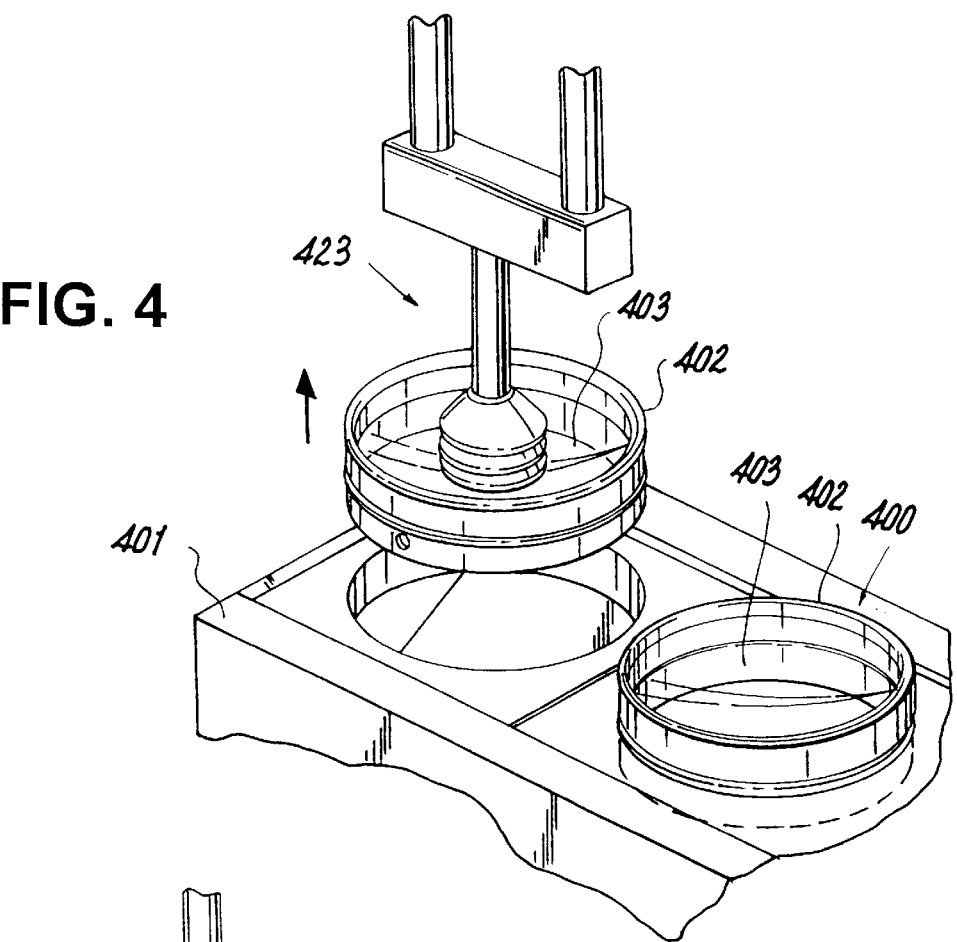
FIG. 4 is a perspective view of a lens casting mold as it is removed from a staging conveyor by a retracting suction apparatus.
Figure 5:
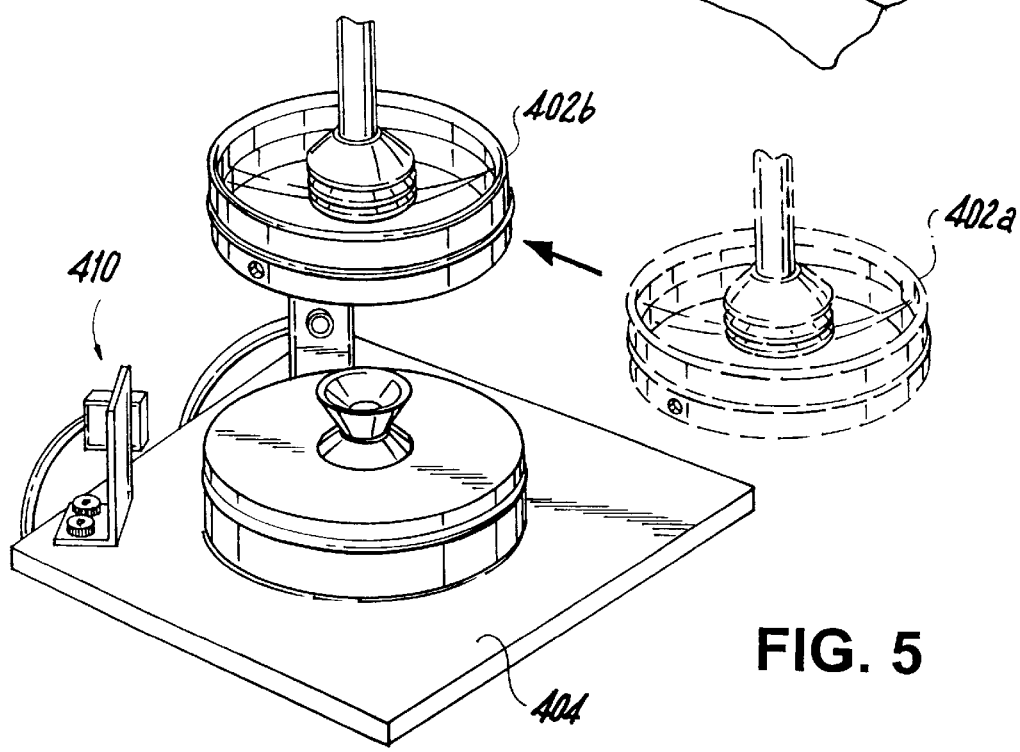
FIG. 5 is a perspective view of the mold as it is transferred to a photo optic scanning platform.
Figure 6:
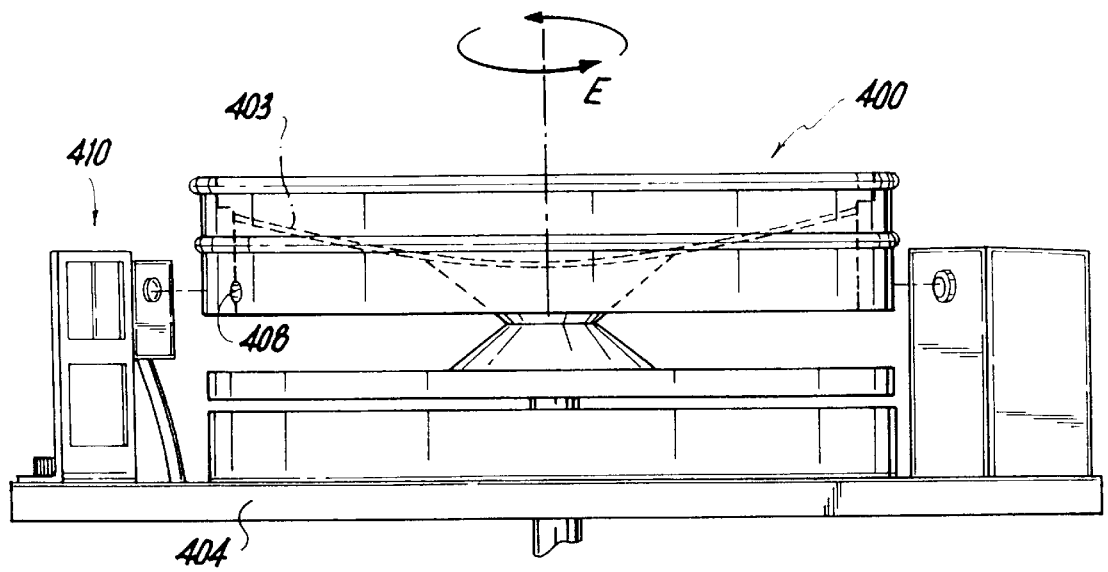
FIG. 6 is a side elevation of the mold on the platform as it is rotated and scanned for proper orientation.
Figure 7:
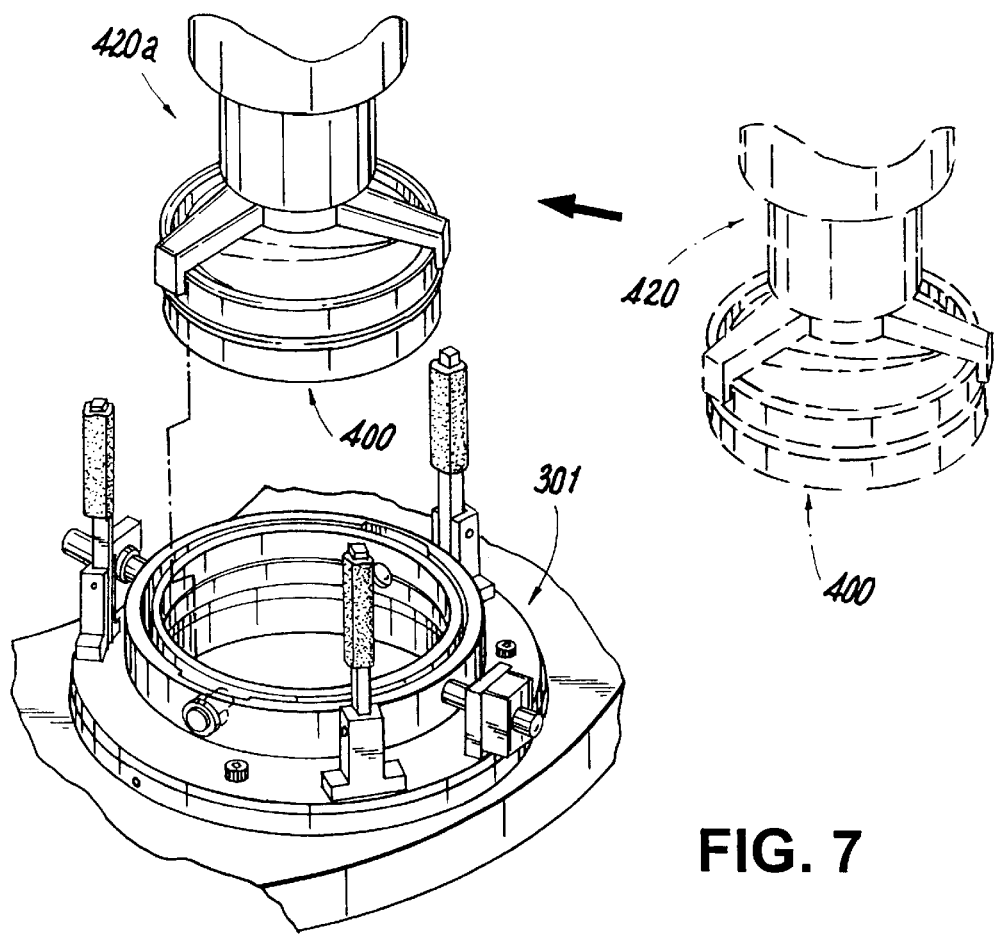
FIG. 7 is a perspective view of the properly oriented mold, as it is transferred to a gimbal fixture by a, three jaw apparatus.

FIGS. 2 through 7 illustrate the glass mold 400 and some of the positions of this mold in accordance with the present invention. The mold includes a holder 402 and a concave glass 403 in which the resin molding is carried out. The concave glass 403 is held into the holder 402 employing ridges as generally illustrated at 405 and 415. The mold 400 also has shoulders 406, 407 which allow it to be placed and supported in an empty gimbal fixture 301. The opening 408 is employed to properly orient the mold 400 at the photo turntable 404 in accordance with the prescription which the mold is to form in the resin being applied to the preform. Movement of a mold 402 from the staging belt 401 employing suction apparatus 423 is illustrated in FIG. 4. As shown in FIG. 5, this mold 402, supported by the suction apparatus 423, is moved, successively, as shown by the designations 402a, 402b, to a position above the turntable 404. Appropriate signals are provided by sensing means 410, working in conjunction with opening 408 in the glass mold to allow for proper alignment of the mold. This alignment is accomplished by rotation of the mold, as illustrated by the circular arrows E in FIG. 6, tilting, or combinations thereof. The now aligned mold 400 is lifted by the three-arm gripper 420 which moves to the position 420a in FIG. 7 above and aligned with an empty gimbal assembly 301. Other types of grippers such as diaphragm and vacuum grippers could be substituted.

Figure 8:
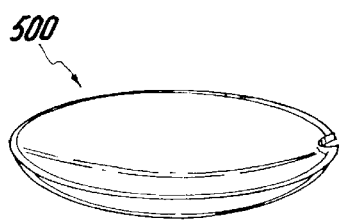
FIG. 8 is a perspective view of a typical optical preform.
Figure 10:
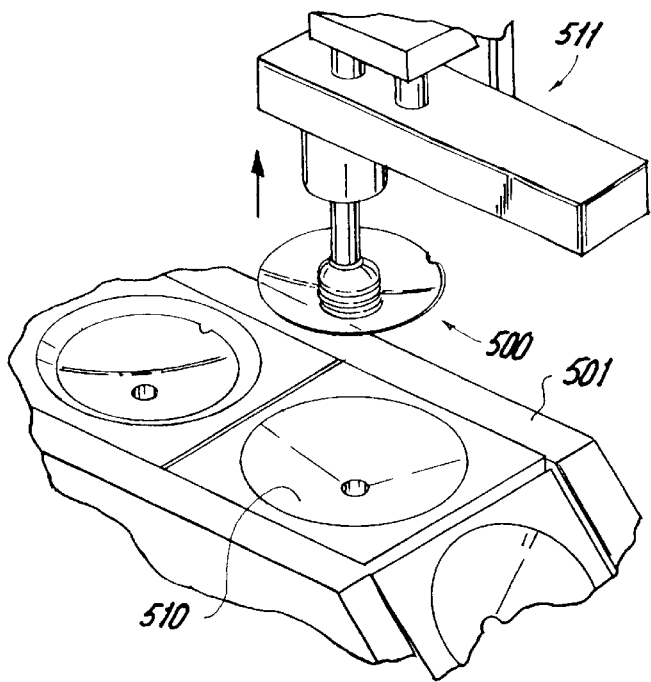
FIG. 10 is a perspective view of the preform as it is removed from a second staging conveyor by a retracting suction apparatus.
Figure 9:
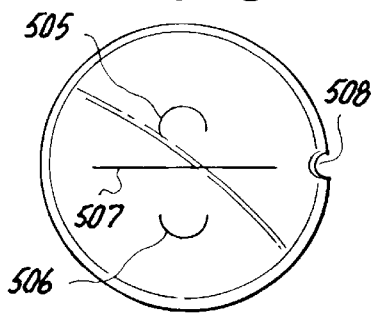
FIG. 9 is a plan view of the optical preform, with optical zones graphically marked in relation to an orienting notch.
Figure 11:
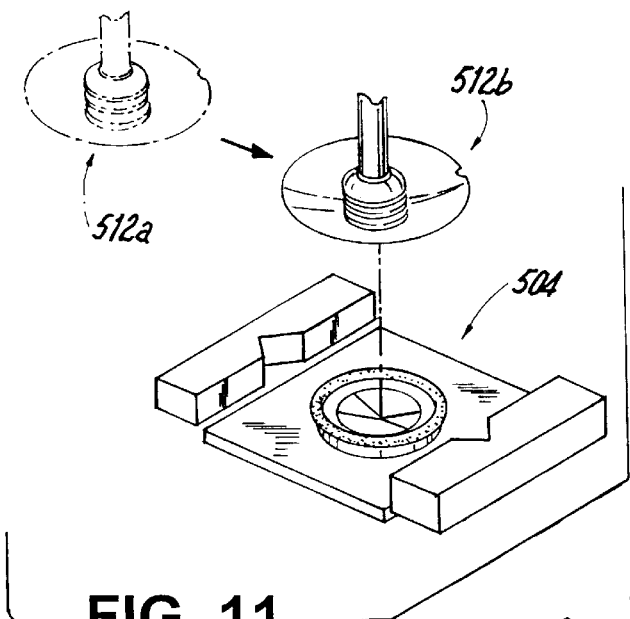
FIG. 11 is a perspective view of the preform as it is transferred to a turntable platform.
Figure 12:
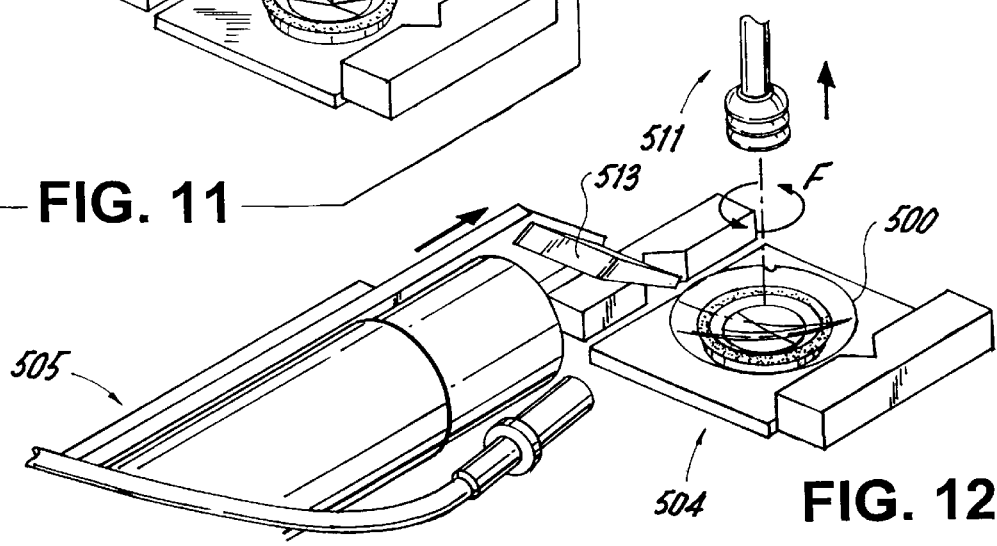

The preform 500, which forms the male portion of the mold employed with apparatus of the present invention as illustrated, and the apparatus used to transport and orient it for ultimate insertion into the complete mold assembly, are shown in FIGS. 8 through 12. Orientation can be accomplished by "marking" the preform with a notch on the edge to be detected optically, a bump to be sensed mechanically, or a scribe or ink mark on the edge to be detected optically. FIG. 8 is a perspective view of a typical optical preform 500, while FIG. 9 is a plan view of the same item with the optical zones graphically marked, 505, 506, 507. In the preferred embodiment, a notch 508 provides for orientation of the preform 500, as illustrated in FIG. 12, to be described. A preform 500 is picked up from the preform staging belt 501, particularly from the depression 510.

The preform 500 which has been raised by the retracting suction apparatus 511 is moved from the position 512a to 512b, as shown in FIG. 11. The preform is then lowered to the preform turntable 504, and the retracting suction apparatus 511 is disconnected from the preform 500. As above-described, alternatively the preform is placed onto the indexing table and thereon undergoes notch detection.

The strobe and camera 505 are moved forward, as illustrated in FIG. 12, the strobe light acting through prism 513 to control rotation of the preform 500, as indicated by circular arrows F, until the, appropriate orientation of the preform 500 is obtained based upon the notch 508. As previously indicated, locating or detecting means other than the strobe and camera could be used to control the rotation of the preform. In order to lock the preform 500 in place, without damaging it, and to also provide means for completing assembly of the complete mold assembly 200, a gripping means such as preform gripper 230, illustrated in FIGS. 13 through 15 is provided. The gripper 230 is shown in the preferred form of a vacuum gripper. As best shown in FIG. 14, the interior of the preform gripper has a chamber 235. A chamfered screw 237 is held in place in a chamfered portion 238 of the chamber 235 by the action of spring member 240, acting on knurled nut 241. An O-ring 275, placed on the bottom of the preform gripper 230, can be lowered to be placed against the preform 500 held in the preform turntable 504.

An assembly view of the preform gripper 230 is shown in FIG. 15, including an upper section 260, having an opening 261, through which chamfered screw 237 passes, then passing through spring 240 and being connected to knurled nut 241 via internal threading 242. The internal chamber 235, to be made airtight, is provided around the lower portion of section 260, and includes the rim 262. A seal 263, held against this rim by plate 264, is held in place by screws 265 entering threaded portions 266 formed on rim 262. A gasket 270 is provided to insure airtightness for nozzle 271 which fits snugly within threaded opening 272 of plate 264. The front portion 273 of nozzle 271 is provided with a shoulder 274 to accommodate O-ring 275, the latter making actual contact with the preform 500. As an alternative, the gripper may incorporate vacuum bellows to contact the preform.

When the preform gripper 230 has been fully assembled, the retractable legs 280 of a gripper member 281, which is attached to means for moving the preform gripper horizontally and vertically, such as a robotic arm 282, make contact with the shoulder 283 formed on the upper section 260 of the preform gripper. As illustrated in FIG. 16, the gripper member 281 is first moved downwardly for the legs to make contact with the preform gripper 230, the legs retracted and the gripper member 281 moved upwardly (as shown by the reversible arrow). The robotic arm then swings the preform gripper 230 over the properly oriented preform 500 held in the preform turntable 504, as shown in FIG. 17. The preform gripper 230 is then moved downwardly by the robotic arm, as shown in FIG. 18, until the O-ring 275 contacts the preform 500. A rod 290 within the robotic arm 282 depresses knurled nut 241 against spring 240, thus moving chamfered screw 237 away from chamfer 238, and a vacuum is drawn, drawing the preform 500 against the O-ring 275. The rod 290 is withdrawn, allowing the spring 240 to move against the knurled nut 241, thus closing the opening through movement of the chamfered screw 237. A vacuum is held in chamber 235, holding the preform 500 against the O-ring 275. The entire assembly is then moved upwardly, as shown in FIG. 20, with the retractor legs 280 held against the shoulder 283, causing the preform gripper 230 with the attached preform to move upwardly. The robotic arm is moved out of the way and a gripping apparatus, such as the three jaw apparatus 291, grasps the preform gripper 230 with the attached preform 500, as shown in FIG. 21. This assembly is moved, as shown in FIG. 22, from a position A over the preform turntable, to a position B, over the empty gimbal fixture 301. The three jaw apparatus 291 lowers the gripper toward the empty gimbal fixture 301, as shown in FIG. 23, the downward movement stopping where the apex of the preform 500 just touches the glass mold 400.

The empty gimbal fixture 301 is best illustrated in FIGS. 24 through 28. It includes a platform 310 on which are mounted three identical pedestals 311; identical legs 312 are pivotably held in each pedestal by a pin 313 which allows movement of the legs to a position as shown in FIG. 27, where the legs 312 are essentially upright, or to a position as shown in FIG. 28, where the upper portion of the leg moves away from the center of the empty gimbal fixture 301. The upper portion of each leg is covered with a rubber grommet 314, or similar device, which has sufficient friction to hold another metallic part in place. As shown in FIGS. 27 and 28, a portion 323 of each of the legs passes through plate 310 and into a protected slot 326. Extended member 325 is attached by a spring 322 to a firmly mounted post 320. Extended members 325 move within slots 321 formed in the plate 327. These extended members 325 are screwed in from the top, as shown by the knurled knobs 328. It will be appreciated that, due to the positioning of the members 325, the springs 322 and the posts 320, the normal position of the legs 312 is upright as shown in FIG. 27.

The plate 327 is provided with three openings 330. A rotatable member 331 is mounted below the indexing dial 100, below the point where the complete mold assemblies are formed; three pins 332 are mounted to the top of rotatable member 331. Pins 332 pass through slots 333 formed in the indexing dial 100 and are fixed in openings 330. Plate 310 is firmly fixed to indexing dial 100 by screws 335 which pass through washers 336 and are screwed into threaded openings 337.

At the point where the preform is to be placed into the gimbal fixture, rotatable member 331 is moved in the direction shown by arrows G to force the slots 326 along the members 323, against the action of springs 322, this causes the legs 312 of which the members 323 form part, to pivot outwardly to the position shown in FIG. 28. This provides for free clearance of the preform gripper 230.

Two additional pedestals 600 are attached to the plate 310. Axles 601 and 602 pass through the pedestals 600 and are firmly attached to the outer ring 603 of a gimbal formed on the gimbal fixture 300. Each pedestal 600 includes a braking mechanism, well-known in the art, to arrest rotation of the gimbal outer ring at an appropriate point and cause it to remain in place. The inner gimbal ring 610 pivots on axes 611 which pass through the outer ring 603 and through the inner ring 610. Spring members 612 are provided on the inner ring 610 to arrest the rotational motion of the inner ring at the appropriate point. The gimbal fixture with the mold in place is indexed forward to the position shown in FIG. 30 where the preform gripper 230 is directly over it, as previously explained. The jaw apparatus 291 now releases it so that it falls by gravity, or is driven by a servo motor (not shown) to a point where the apex of the preform touches the glass mold 400 as shown in FIG. 23. The jaw apparatus 291 may be equipped with a measuring means, such as a load cell, a counter balance, the feedback current of a driving motor, or optical deformation (not shown) that measures the force applied to the mold at the touch point. An electrical feedback mechanism (not shown) raises jaw apparatus 291 when the measuring means reading reaches a critical value. This value is such that a desired, predetermined gap, such as a 75 micron gap is left between the preform and the glass mold for all preforms, and it is set so that the deforming of the preform due to this force is less than 0. This actuates a servo mechanism (not shown) so that when the gripper is again lowered, the desired spacing will remain between the preform 500 and the glass mold 400.

In addition, the contacting of the preform 500 and the mold 400 causes rotation of the gimbal rings to provide proper orientation of the mold 400. The preform gripper with the preform attached is then raised, as shown in FIG. 29, and the resinous lens material 125 is allowed to flow into the glass mold from the retractable outlet 120. The resin preferably is heated prior to casting, generally, to above the $T_g$ of the cured resin, preferably to greater than about 40° C. Any manner of heating can be used. The legs on the gimbal assembly, at this time, are in the position shown in FIG. 28. The gripper is again lowered, as shown in FIG. 30, descending to such a point that the desired spacing is left between the preform and the glass mold. Member 331 now rotates in the direction shown by the arrows H so that the springs 322 return plate 327 to its original position which causes the legs 312 to move inwardly and assume the position shown in FIG. 27 where they firmly seat against the preform gripper 230 and maintain the spacing between the preform 500 and the glass mold 400.

At this point, the mold assembly 200 is completed and is indexed into the curing chamber 110 wherein it is acted on by ultraviolet radiators 130 to cure the resin placed into the molds. Heat can be supplied in the chamber by any convenient means such as hot air, infrared heaters, or the like. The chamber 110 may be enclosed within an insulating material (not shown) enabling the chamber to be heated or cooled within a desired temperature range. The entire chamber may be divided into two or more thermnostatted zones, each of which may be separately controlled. Indexing continues until a completed mold assembly reaches the position 201 as illustrated in FIG. 32. Means, such as robotic arm 210, may be provided to lift the preform gripper/preform assembly and the mold from the indexing dial 100. The cured resin adheres to the glass and, thus, the mold is removed along with the other portions. The robotic arm moves the assembly over conveyor belt 220 where the vacuum within chamber 235 is released to allow separation of the preform gripper 230 and preform 500. The gripper device is retained and returned to a position to be employed in gripping another preform over the preform turntable 504. Alternatively, the preform gripper/preform assembly may remain on the index dial, the gripper releases the preform, and the gripper device is returned to a position for gripping another preform.

The joined preform and mold remain on the conveyor 220, or on the indexing dial, where they are chilled to a temperature of from about ambient temperature to about −20° C. Preferably chilled air is directed against the combined members by a bladder member 750, chilled air recycling through a chamber 751 having inlet and outlet ducts 752 and 753. Other means of chilling, such as a dip in a cold liquid, blown cold gas, or wholly or partially liquid gas can be substituted. Because of the differential rate of cooling of the cast resin and the mold, the two separate from each other. At the end of the conveyor or dial, they are picked up by a gripper, such as the three jaw apparatus, as shown in FIG. 36, and moved to a discharge conveyor. The chilled preform with the cast layer attached is removed, as by a suction member, from the mold, being separated as illustrated in FIG. 37. The mold may be returned to the staging belt 401 or removed for cleaning and storing, and the lens is removed from the system for further processing. As seen in FIG. 38, the preform 500 now has a resinous layer 760.

FIG. 39 illustrates an alternate embodiment of the apparatus of the present invention in which the molds move on an indexing dial 800 set inside the indexing dial 100. Molds are moved along the indexing dial 800 to a position adjacent the empty gimbal fixture 301 in position J, as in the first embodiment. Indexing dial 100 continues to move, as in the first embodiment, and the preform 500 and preform gripper 230 are placed into the gimbal fixture which now has had the glass mold put in place at station K. With further indexing, the preform gripper is held in place by movement of the arms 312 in station L, and processing then proceeds as with the embodiment previously described.

An apparatus for the automatic manufacture of composite ophthalmic lenses has been illustrated, including a single mechanism which allows for all portions of the mold and associated pieces to be locked firmly in the proper position during curing. The invention should not be considered as limited by the specific description given, but only as limited by the appended claims.

What is claimed is:

1. An apparatus for the automated manufacture of composite ophthalmic lenses comprising:
    (a) means for forming and indexing complete mold assemblies, said assemblies consisting essentially of:
        (1) a mold;
        (2) an optical preform;
        (3) a single mechanism for holding the optical preform at a desired angular orientation and desired distance relative to the mold corresponding to the prescription of an ophthalmic lens to be formed;
        (4) means for introducing resin to be cured into the space between the optical preform and the mold;
    (b) means to index the complete mold assemblies through a curing chamber having means for curing the resin as a layer on said optical preform; and,
    (c) means for removing the optical preform and cured resin layer from the mold.

2. The apparatus of claim 1, wherein the means for curing are means for providing ultraviolet radiation.

3. The apparatus of claim 2, wherein the means for curing further comprises a means for heating.

4. The apparatus of claim 1, further comprising means for cooling the optical preform, resin, and mold so as to separate the optical preform and resin from the mold.

5. The apparatus of claim 1, further comprising means to align the mold before the mold is placed into the single mechanism.

6. The apparatus of claim 1, further comprising means to align the optical preform before the optical preform is placed into the single mechanism.

7. The apparatus of claim 6, wherein the optical preform is placed into the single mechanism at a station after a station at which the mold is placed into the single mechanism.

8. The apparatus of claim 6, further comprising a preform gripper for holding the optical preform and wherein the single mechanism further comprises means to firmly grip said preform gripper.

9. The apparatus of claim 8, further comprising means to recycle said optical preform to a gripper alignment means following separation of the optical preform, cured resin, and mold from the apparatus after curing in said curing chamber.

10. The apparatus of claim 1, wherein said single mechanism comprises a gimbal.

11. The apparatus of clam 8, wherein said preform gripper further comprises a vacuum chamber to hold said optical preform.

12. The apparatus of claim 8, wherein the single mechanism comprises spring-loaded legs.

13. The apparatus of claim 12, wherein said spring-loaded legs are pivotable from a position holding said preform gripper to a position wherein said preform gripper is released.

* * * * *